US012744251B2

United States Patent
(12) United States Patent
Nakazawa et al.

(10) Patent No.: US 12,744,251 B2
(45) Date of Patent: Sep. 22, 2026

(54) NONAQUEOUS ELECTROLYTE SECONDARY BATTERY FUNCTIONAL LAYER

(71) Applicant: Sumitomo Chemical Company, Limited, Tokyo (JP)

(72) Inventors: Shun Nakazawa, Niihama (JP); Kensaku Horie, Niihama (JP); Mitsuki Ochiai, Niihama (JP)

(73) Assignee: SSLM CO., LTD., Daegu (KR)

(*) Notice: Subject to any disclaimer, the term of this patent is extended or adjusted under 35 U.S.C. 154(b) by 492 days.

(21) Appl. No.: 18/385,995

(22) Filed: Nov. 1, 2023

(65) Prior Publication Data

US 2024/0154172 A1 May 9, 2024

(30) Foreign Application Priority Data

Nov. 4, 2022 (JP) ................................ 2022-177674

(51) Int. Cl.

| | |
|---|---|
| ***H01M 50/489*** | (2021.01) |
| ***H01M 10/0565*** | (2010.01) |
| ***H01M 10/0569*** | (2010.01) |
| ***H01M 50/491*** | (2021.01) |

(52) U.S. Cl.

CPC ... *H01M 10/0569* (2013.01); *H01M 10/0565* (2013.01); *H01M 50/489* (2021.01); *H01M 50/491* (2021.01); *H01M 2300/0028* (2013.01); *H01M 2300/0082* (2013.01); *H01M 2300/0085* (2013.01)

(58) Field of Classification Search

CPC ............. H01M 50/417; H01M 50/451; H01M 50/489; H01M 50/491

See application file for complete search history.

(56) References Cited

U.S. PATENT DOCUMENTS

| | | | | |
|---|---|---|---|---|
| 2007/0264577 | A1 | 11/2007 | Katayama et al. | |
| 2009/0067119 | A1 | 3/2009 | Katayama et al. | |
| 2009/0253032 | A1 * | 10/2009 | Takita ..................... | B29C 48/91 156/229 |
| 2020/0052269 | A1 | 2/2020 | Taguchi et al. | |

FOREIGN PATENT DOCUMENTS

| | | |
|---|---|---|
| JP | 2008123988 A | 5/2008 |
| WO | 2019065844 A1 | 4/2019 |

* cited by examiner

*Primary Examiner* — Kevin E Yoon

(74) *Attorney, Agent, or Firm* — Panitch Schwarze Belisario & Nadel LLP

(57) ABSTRACT

Provided is a nonaqueous electrolyte secondary battery functional layer that has an improved cycle characteristic when an electrode with a great change in volume is used. A nonaqueous electrolyte secondary battery functional layer in accordance with an embodiment of the disclosure is configured such that an area ratio of pores each having a cross-sectional area of not less than 0.1 $\mu m^2$ is not less than 30% by area with respect to all pores present in a cross section of the nonaqueous electrolyte secondary battery functional layer.

6 Claims, 3 Drawing Sheets

NONAQUEOUS ELECTROLYTE SECONDARY BATTERY FUNCTIONAL LAYER

This Nonprovisional application claims priority under 35 U.S.C. § 119 on Patent Application No. 2022-177674 filed in Japan on Nov. 4, 2022, the entire contents of which are hereby incorporated by reference.

TECHNICAL FIELD

The present invention relates to a functional layer for a nonaqueous electrolyte secondary battery (hereinafter referred to as a "nonaqueous electrolyte secondary battery functional layer").

BACKGROUND ART

Nonaqueous electrolyte secondary batteries (in particular, lithium-ion secondary batteries) have a high energy density, and are therefore in wide use as batteries for personal computers, mobile telephones, portable information terminals, and the like. Such nonaqueous electrolyte secondary batteries have recently been developed as on-vehicle batteries.

Separators, which are members constituting nonaqueous electrolyte secondary batteries, have also been improved so as to enhance performance of the nonaqueous electrolyte secondary batteries. For example, Patent Literature 1 discloses an electric chemical element separator including a separator layer (I) made of a microporous film and a porous separator layer (II) containing a filler as a main component.

CITATION LIST

Patent Literature

[Patent Literature 1]

Patent Application Publication, Tokukai, No. 2008-123988

SUMMARY OF INVENTION

Technical Problem

It has been known that a nonaqueous electrolyte secondary battery which is being charged expands an electrode (in particular, a negative electrode) and results in an increase in internal pressure. An increase in capacity of a nonaqueous electrolyte secondary battery has recently resulted in an increase in size of a battery and in use of an electrode of a next-generation material (such as an Si negative electrode, an Li metal negative electrode, or a sulfur positive electrode). Due to such a change, an internal pressure is further increased during charging of a next-generation nonaqueous electrolyte secondary battery than during charging of a conventional nonaqueous electrolyte secondary battery. Specifically, in a next-generation nonaqueous electrolyte secondary battery, a greater pressure is applied to a separator. This accordingly results in an increase in amount in which the separator is pressed in by expansion of an electrode.

Under such a premise, a conventional technique as disclosed in Patent Literature 1 has room for improvement in cycle characteristic during use of an electrode with a great change in volume.

An embodiment of the present invention has an object to provide a nonaqueous electrolyte secondary battery functional layer that has an improved cycle characteristic when an electrode with a great change in volume is used.

Solution to Problem

A nonaqueous electrolyte secondary battery functional layer in accordance with an embodiment of the present invention is configured such that an area ratio of pores each having a cross-sectional area of not less than 0.1 $\mu m^2$ is not less than 30% by area with respect to all pores present in a cross section of the nonaqueous electrolyte secondary battery functional layer.

Advantageous Effects of Invention

An embodiment of the present invention provides a nonaqueous electrolyte secondary battery functional layer that has an improved cycle characteristic when an electrode with a great change in volume is used.

DESCRIPTION OF EMBODIMENTS

Figure 1:
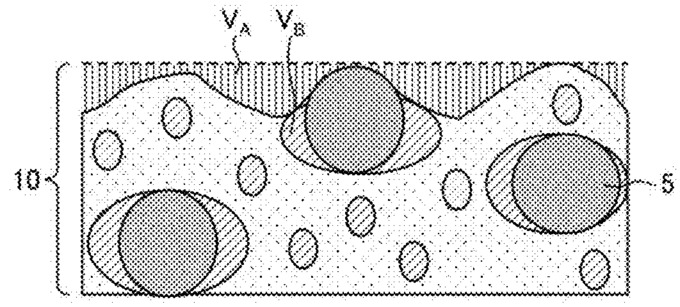
FIG. 1 is a schematic view for describing, in an embodiment of the present invention, an uneven space volume on a surface of a functional layer and an internal void volume of the functional layer.

The following description will discuss an embodiment of the present invention. The present invention is, however, not limited to the embodiment below. The present invention is not limited to the arrangements described below, but may be altered in various ways by a skilled person within the scope of the claims. Any embodiment based on a proper combination of technical means disclosed in different embodiments is also encompassed in the technical scope of the present invention.

Note that any numerical range expressed as "A to B" herein means "not less than A and not more than B" unless otherwise stated.

A nonaqueous electrolyte secondary battery functional layer in accordance with an embodiment of the present invention (hereinafter referred to as a "functional layer") is configured such that an area ratio of pores each having a cross-sectional area of not less than 0.1 $\mu m^2$ is not less than 30% by area with respect to all pores present in a cross section of the nonaqueous electrolyte secondary battery functional layer.

The following description will discuss example embodiments of the functional layer.

[1. Size of Void Included in Functional Layer]

In a cross section of the functional layer, an area ratio of pores each having a cross-sectional area of not less than 0.1 $\mu m^2$ is not less than 30% by area with respect to all pores present in the cross section.

The functional layer in which the area ratio of the pores each having a cross-sectional area of not less than 0.1 $\mu m^2$ is in the above specific range makes it possible to improve a cycle characteristic under pressure.

[1.1. Pore Having Cross-Sectional Area of not Less than 0.1 $\mu m^2$]

The functional layer has pores each having a cross-sectional area of not less than 0.1 $\mu m^2$ (hereinafter also referred to as large-diameter pores). An area ratio of the large-diameter pores with respect to a total area of all the pores present in the cross section of the functional layer is not less than 30% by area. The area ratio of the large-diameter pores has an upper limit that is, for example, not more than 70% by area or not more than 65% by area. The cross-sectional area of a pore and the area ratio of the pores satisfying a predetermined condition are measured by image analysis of a cross-sectional SEM image.

According to the functional layer in which the area ratio of the large-diameter pores is in the above specific range, a liquid retention property of an electrolyte is further increased as compared with the conventional technique. This is considered to result in a longer Li metal dissolution/deposition lifetime and an improved cycle characteristic under pressure.

The functional layer in which the area ratio of the large-diameter pores is in the above specific range makes it possible to improve a cycle characteristic under pressure. For example, the number of cycles is not less than 100 cycles when the functional layer in which the area ratio of the large-diameter pores is in the above specific range is incorporated into an Li symmetric cell and is subjected to a constant current cycle test. A method for carrying out the constant current cycle test is identical to a method described in Examples of the present application.

[2. Makeup of Functional Layer]

The functional layer preferably contains a first filler. The first filler has an average particle diameter of preferably not more than 0.03 μm. The functional layer preferably contains a second filler. The second filler has an average particle diameter of preferably not less than 1 μm. The functional layer more preferably contains the first filler and the second filler.

The functional layer that contains the first filler and/or the second filler makes it possible to reduce an increase in air permeability (Gurley value) during compression.

[2.1. Filler]

The functional layer preferably contains the first filler and/or the second filler. The first filler and the second filler have different average particle diameters. The first filler has a smaller average particle diameter than the second filler. The functional layer that contains the first filler and/or the second filler has a higher porosity and is easily compressed when a pressure is applied thereto. It is therefore considered that compression of a polyolefin base material is reduced, so that an increase in air permeability (Gurley value) during compression is reduced. Furthermore, the functional layer that contains the first filler and/or the second filler results in lower air permeability (Gurley value) during uncompression.

The average particle diameter of the first filler has an upper limit that is preferably not more than 0.03 μm, more preferably not more than 0.025 μm, and still more preferably not more than 0.02 μm. The average particle diameter of the first filler has a lower limit that is, for example, not less than 0.001 μm or not less than 0.005 μm.

The average particle diameter of the second filler has a lower limit that is preferably not less than 1 μm, and more preferably not less than 1.5 μm. The average particle diameter of the second filler has an upper limit that is, for example, not more than 10 μm, not more than 8 μm, or not more than 6 μm.

The average particle diameters of the first filler and the second filler are particle diameters at which a cumulative frequency reaches 50% in a volume-based particle size distribution.

The first filler and the second filler may be primary particles or may be secondary particles. When the first filler and/or the second filler is/are secondary particles, the average particle diameter of the first filler and/or the second filler is the average particle diameter of the secondary particles.

Thus, the following categories 1a and 1b satisfy the above-described suitable conditions of the first filler. The following category 1c may satisfy the above-described suitable conditions of the first filler.

Category 1a: The first filler is primary particles with no secondary particles formed, and the primary particles have an average particle diameter of not more than 0.03 μm.

Category 1b: The first filler is secondary particles, and the secondary particles have an average particle diameter of not more than 0.03 μm.

Category 1c: The first filler is secondary particles, and primary particles constituting the secondary particles have an average particle diameter of not more than 0.03 μm.

Similarly, the following categories 2a and 2b satisfy the above-described suitable conditions of the second filler. The following category 2c may satisfy the above-described suitable conditions of the second filler.

Category 2a: The second filler is primary particles with no secondary particles formed, and the primary particles have an average particle diameter of not less than 1 μm.

Category 2b: The second filler is secondary particles, and the secondary particles have an average particle diameter of not less than 1 μm.

Category 2c: The second filler is secondary particles, and primary particles constituting the secondary particles have an average particle diameter of not less than 1 μm.

The first filler and the second filler each may be made of a material that is not particularly limited. Examples of a type of filler include an organic filler and an inorganic filler.

Examples of a material of the organic filler include (i) homopolymers and copolymers of monomers such as styrene, vinyl ketone, acrylonitrile, methyl methacrylate, ethyl methacrylate, glycidyl methacrylate, glycidyl acrylate, and methyl acrylate; fluorine-containing resins such as polytetrafluoroethylene, an ethylene tetrafluoride-propylene hexafluoride copolymer, an ethylene tetrafluoride-ethylene copolymer, and polyvinylidene fluoride; melamine resins; urea resins; polyolefins; polymethacrylates; and polyurethanes. Only one type of organic filler may be used. Alternatively, two or more types of organic fillers may be used. At least one selected from the group consisting of polystyrene, methyl polymethacrylate, polyurethane, and polytetrafluoroethylene is preferable due to their chemical stability.

At least one selected from the group consisting of polystyrene and methyl polymethacrylate is more preferable due to their chemical stability.

Examples of a material of the inorganic filler include inorganic matters. Examples of such a material include a metal oxide, a metal nitride, a metal carbide, a metal hydroxide, a carbonate, and a sulfate. More specific examples of the material include powders of, for example, aluminum oxide (alumina), boehmite, silica, titania, magnesia, barium titanate, barium sulfate, aluminum hydroxide, magnesium hydroxide, and calcium carbonate. Further specific examples of the material include powders of minerals such as mica, zeolite, kaolin, and talc. Only one type of inorganic filler may be used. Alternatively, two or more types of organic fillers may be used. At least one selected from the group consisting of an aluminium oxide, silica, and boehmite is preferable due to their chemical stability.

Examples of a shape of the filler include a substantially spherical shape, a plate shape, a columnar shape, a needle shape, a whisker shape, and a fibrous shape. A substantially spherical filler, which makes it easy to form uniform pores, is preferable.

The first filler and the second filler each can be heat-resistant particles. The heat-resistant particles are substantially unfused even under a high-temperature environment (for example, 200° C.). In contrast, non-heat-resistant particles are fused with other particles or a polyolefin base material under the high-temperature environment. The non-heat-resistant particles can be mixed so as to carry out a function equivalent to that of a binder resin. However, heat-resistant particles are commonly unexpected to carry out such a function.

A volume fraction of the second filler with respect to a total volume of the first filler and the second filler has a lower limit that is preferably not less than 30% by volume, more preferably not less than 35% by volume, and still more preferably not less than 40% by volume. The volume fraction of the second filler has an upper limit that is, for example, not more than 90% by volume or not more than 85% by volume.

[2.2. Binder Resin]

The functional layer may contain a binder resin. Examples of the binder resin include polyolefins; (meth) acrylate-based resins; fluorine-containing resins; polyester-based resins; rubbers; resins each having a melting point or a glass transition temperature of not lower than 180° C.; water-soluble polymers; polycarbonates, polyacetals, polyether ether ketones; and nitrogen-containing aromatic resins.

Examples of the polyolefins include polyethylene, polypropylene, polybutene, and an ethylene-propylene copolymer.

Examples of the fluorine-containing resins include polyvinylidene fluoride (PVDF), polytetrafluoroethylene, a vinylidene fluoride-hexafluoropropylene copolymer, a tetrafluoroethylene-hexafluoropropylene copolymer, a tetrafluoroethylene-perfluoroalkyl vinyl ether copolymer, a vinylidene fluoride-tetrafluoroethylene copolymer, a vinylidene fluoride-trifluoroethylene copolymer, a vinylidene fluoride-trichloroethylene copolymer, a vinylidene fluoride-vinyl fluoride copolymer, a vinylidene fluoride-hexafluoropropylene-tetrafluoroethylene copolymer, and an ethylene-tetrafluoroethylene copolymer. The fluorine-containing resins are also exemplified by fluorine-containing rubbers each having a glass transition temperature of not higher than 23° C.

Examples of the polyester-based resins include aromatic polyesters such as polyarylate and liquid crystal polyesters.

Examples of the rubbers include a styrene-butadiene copolymer and a hydride thereof, a methacrylic acid ester copolymer, an acrylonitrile-acrylic acid ester copolymer, a styrene-acrylic acid ester copolymer, ethylene propylene rubber, and polyvinyl acetate.

Examples of the resins each having a melting point or a glass transition temperature of not lower than 180° C. include polyphenylene ether, polysulfone, polyether sulfone, polyphenylene sulfide, polyetherimide, polyamide imide, and polyether amide.

Examples of the water-soluble polymers include polyvinyl alcohol, polyethylene glycol, cellulose ether, sodium alginate, polyacrylic acid, polyacrylamide, and polymethacrylic acid.

Examples of the nitrogen-containing aromatic resins include aromatic polyamides, aromatic polyimides, aromatic polyamide imides, polybenzimidazoles, polyurethanes, and melamine resins. Examples of the aromatic polyamides include wholly aromatic polyamides (aramid resins) and semi-aromatic polyamides. Examples of the wholly aromatic polyamides include para-aramids and meta-aramids. Among the above-listed nitrogen-containing aromatic resins, wholly aromatic polyamides are preferable, and para-aramids are more preferable.

The term "para-aramid" herein indicates a wholly aromatic polyamide in which amide bonds are located at para positions or quasi-para positions of an aromatic ring. The expression "quasi-para positions" indicates positions which are located on opposite sides of an aromatic ring and which are located coaxially or in parallel to each other. Examples of such positions include positions 4 and 4' of a biphenylene ring, positions 1 and 5 of a naphthalene ring, and positions 2 and 6 of a naphthalene ring.

Specific examples of the para-aramids include poly(paraphenylene terephthalamide), poly(parabenzamide), poly(4,4'-benzanilide terephthalamide), poly(paraphenylene-4,4'-biphenylene dicarboxylic acid amide), poly(paraphenylene-2,6-naphthalene dicarboxylic acid amide), poly(2-chloroparaphenylene terephthalamide), a paraphenylene terephthalamide/2,6-dichloroparaphenylene terephthalamide copolymer, poly(4,4'-diphenylsulfonyl terephthalamide), and a paraphenylene terephthalamide/4,4'-diphenylsulfonyl terephthalamide copolymer. The resins listed as specific examples are each a para-aramid having a para-oriented structure or a quasi-para-oriented structure. Among the above-listed para-aramids, poly(paraphenylene terephthalamide) is preferable because poly(paraphenylene terephthalamide) is easy to produce and handle.

The functional layer may contain only one or two or more types of the above binder resins.

When the functional layer contains a binder resin, the binder resin need not contain a fluorine-containing resin. The functional layer may contain a binder resin, but the binder resin need not contain polyvinylidene fluoride.

A volume fraction of a total of the first filler and the second filler with respect to a total volume of the functional layer has a lower limit that is preferably not less than 30% by volume, and more preferably not less than 40% by volume. The volume fraction of the total of the first filler and the second filler has an upper limit that is, for example, not more than 80% by volume, not more than 70% by volume, or not more than 60% by volume.

A volume fraction of the binder resin with respect to the total volume of the functional layer has a lower limit that is preferably not less than 20% by volume, more preferably not less than 30% by volume, and still more preferably not less than 40% by volume. The volume fraction of the binder resin has an upper limit that is, for example, not more than 70% by volume or not more than 60% by volume.

The functional layer contains an inorganic substance in an amount of, for example, not more than or less than 75% by volume, not more than or less than 70% by volume, or not more than or less than 65% by volume. The functional layer need not contain any inorganic substance. The inorganic substance as used herein mainly means the inorganic filler. Neither the organic filler nor the binder resin is the inorganic substance. Specifically, the functional layer need not contain any inorganic filler. Alternatively, the functional layer may contain only the binder resin and the organic filler.

The functional layer that contains the first filler and/or the second filler makes it possible to reduce an increase in air permeability (Gurley value) during compression. For example, a rate of increase in air permeability (Gurley value) of a laminated separator during 2 μm compression of the functional layer is not more than 160% or not more than 155%. A method for measuring the rate of increase in air permeability is identical to a method described in Examples of the present application.

[3. Void in Functional Layer]

The functional layer preferably has an internal void volume of not less than 2.5 $mL/m^2$. The functional layer preferably has a surface whose uneven space volume is not less than 0.5 $mL/m^2$. More preferably, the functional layer has an internal void volume of not less than 2.5 $mL/m^2$, and the surface of the functional layer has an uneven space volume of not less than 0.5 $mL/m^2$.

The functional layer whose internal void volume and/or uneven space volume of the surface satisfy/satisfies the above respective specific ranges makes it possible to achieve a higher high-rate discharge capacity after pressure application.

[3.1. Internal Void Volume and Uneven Space Volume of Functional Layer]

The internal void volume and the uneven space volume will be described with reference to exemplary FIG. 1. In the example of FIG. 1, a functional layer 10 contains a filler 5.

The functional layer 10 preferably has unevenness on a surface thereof. A volume per unit area of a space surrounded by this unevenness and at least one predetermined plane is referred to as the uneven space volume. In FIG. 1, the uneven space volume is a total volume per unit area of a vertically-striped part VA. The at least one predetermined plane can be set on the basis of, for example, a load curve of the surface of the functional layer. The at least one predetermined plane is a plane that passes through a point at which a load area ratio is 10% and that is parallel to an in-plane direction, and a plane that passes through a point at which the load area ratio is 80% and that is parallel to the in-plane direction. In this case, the uneven space volume is a volume per unit area of a space surrounded by two planes and unevenness of a surface of a base material layer. The load curve of the surface of the functional layer is produced by a laser microscope and analysis software.

In the functional layer 10, a total of the uneven space volume and the internal void volume is referred to as a total void volume. The total void volume can be calculated by multiplying the porosity of the functional layer by a thickness (average thickness) of the functional layer. The porosity of the functional layer can be calculated from a weight ratio and a real density of each material constituting the functional layer. For example, when the functional layer is made of three types of materials, a porosity ε of the functional layer is calculated by the equation below. In the equation, Wa, Wb, and We are weight ratios (% by weight) of materials a, b, and c, da, db, and dc are real densities ($g/cm^3$) of the materials a, b, and c, and t is the thickness (cm) of the functional layer.

$$\varepsilon(\%)=[1-\{(Wa/da+Wb/db+Wc/dc)/t\}]\times 100$$

The functional layer 10 has therein a space that is not occupied by the materials constituting the functional layer 10. A total volume per unit area of such a space is referred to as the internal void volume. In FIG. 1, the internal void volume is a total volume per unit area of a shaded part VB. The internal void volume is determined by a difference between the total void volume and the uneven space volume.

A more detailed method for measuring the uneven space volume, the internal void volume, and the total void volume of the functional layer is identical to a method described in Examples of the present application.

The internal void volume of the functional layer has a lower limit that is preferably not less than 2.5 $mL/m^2$, more preferably not less than 2.7 $mL/m^2$, and still more preferably not less than 2.9 $mL/m^2$. The internal void volume of the functional layer has an upper limit that is, for example, not more than 6.5 $mL/m^2$, not more than 6.0 $mL/m^2$, or not more than 5.5 $mL/m^2$.

The uneven space volume of the surface of the functional layer has a lower limit that is preferably not less than 0.5 $mL/m^2$, and more preferably not less than 0.6 20 $mL/m^2$. The uneven space volume of the surface of the functional layer has an upper limit that is, for example, not more than 2.5 $mL/m^2$, not more than 2.0 $mL/m^2$, or not more than 1.5 $mL/m^2$.

The functional layer has an average pore diameter that is preferably not more than 38.0 nm, more preferably 36.0 nm, and still more preferably 35.0 nm. The average pore diameter of the functional layer is, for example, not less than 25.0 nm, not less than 28.0 nm, or not less than 29.0 nm. A method for measuring the average pore diameter of the functional layer is identical to a method described in Examples of the present application.

When the internal void volume and/or the uneven space volume of the surface of the functional layer is/are within the above respective specific ranges, the functional layer absorbs expansion of an electrode. This allows a battery characteristic to be maintained. It is therefore considered possible to achieve a higher high-rate discharge capacity after pressure application.

The total void volume of the functional layer has a lower limit that is, for example, not less than 3.0 $mL/m^2$ or not less than 3.5 $mL/m^2$. The total void volume of the functional layer has an upper limit that is, for example, not more than 7.0 $mL/m^2$ or not more than 6.5 $mL/m^2$. The total void volume that is within the above range makes it easy for the uneven space volume and the internal void volume to be in the above respective ranges.

An unevenness height of the functional layer has a lower limit that is, for example, not less than 0.5 μm or not less than 0.7 μm. The unevenness height of the functional layer has an upper limit that is, for example, not more than 3.0 μm or not more than 2.5 μm. The unevenness height that is within the above range makes it easy for the uneven space volume and the internal void volume to be in the above respective ranges. The unevenness height of the functional layer is an average height of a projecting top part of the functional layer in which projecting top part the load area ratio is 0% to 10%.

The porosity of the functional layer is preferably not less than 70%, more preferably not less than 73%, and still more preferably not less than 75%. The porosity of the functional layer can be calculated from a weight ratio and a real density of each material constituting the functional layer.

The functional layer whose internal void volume and/or uneven space volume of the surface satisfy/satisfies the above respective specific ranges makes it possible to achieve a higher high-rate discharge capacity during compression. For example, a 5 C discharge capacity in the first cycle is, for example, not less than 12 mAh after the laminated separator is subjected to pressure application at MPa. A method for measuring the discharge capacity is identical to a method described in Examples of the present application.

The functional layer that contains the first filler and the second filler which have the above respective average particle diameters make it easy for the uneven space volume and the internal void volume to be in the above respective specific ranges.

[4. Orientation of Void Included in Functional Layer]

In the cross section of the functional layer, an area ratio of pores satisfying all the following conditions 1 to 3 is preferably not less than 3% by area with respect to all the pores present in the cross section.

Condition 1: A maximum Feret diameter is not less than 0.5 μm.

Condition 2: An angle at which a pore takes on the maximum Feret diameter is 60° to 120° with respect to the in-plane direction of the functional layer.

Condition 3: The maximum Feret diameter/a minimum Feret diameter has a value of not less than 1.2.

The functional layer in which the area ratio of the pores satisfying all the above conditions 1 to 3 is in the above specific range makes it possible to achieve lower electrode resistance after pressure application.

The functional layer in which the area ratio of the pores satisfying all the above conditions 1 to 3 is in the above specific range also achieves an improvement in liquid absorbency of the electrolyte.

[4.1. Maximum Feret Diameter and Minimum Feret Diameter]

Figure 2:
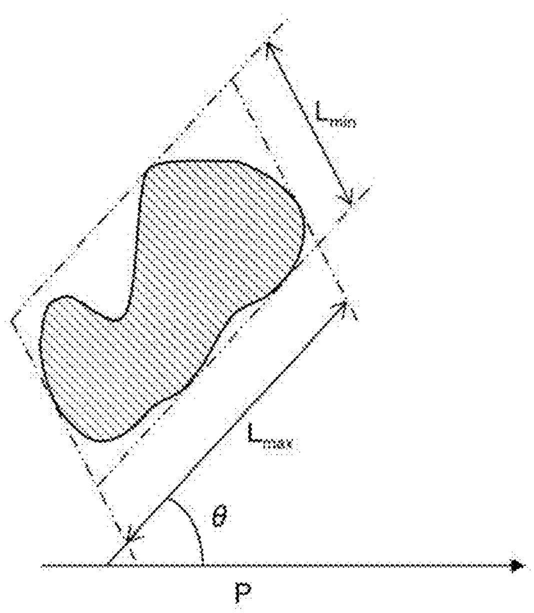
FIG. 2 is a schematic view for describing, in an embodiment of the present invention, a pore subjected to thickness orientation.

The maximum Feret diameter and the minimum Feret diameter will be described with reference to exemplary FIG. 2. A Feret diameter refers to a distance between two parallel lines by which a certain figure is sandwiched. The Feret diameter changes even in an identical figure depending on a method for selecting the two lines. Thus, the maximum Feret diameter and the minimum Feret diameter are present in any figure by properly selecting the two lines. In FIG. 2, $L_{max}$ is the maximum Feret diameter, and $L_{min}$ is the minimum Feret diameter. Note that an angle θ which is made by (i) a line defining the maximum Feret diameter and (ii) a line defining the in-plane direction (line P in FIG. 2) is herein referred to as the angle that takes on the maximum Feret diameter.

An area ratio of pores subjected to thickness orientation in the cross section of the functional layer is defined below. The pores subjected to thickness orientation are each a pore whose shape as seen in the cross section satisfies the following conditions 1 to 3.

Condition 1: The maximum Feret diameter is not less than 0.5 μm.

Condition 2: The angle at which a pore takes on the maximum Feret diameter is 60° to 120° with respect to the in-plane direction of the functional layer.

Condition 3: The maximum Feret diameter/the minimum Feret diameter has a value of not less than 1.2.

In the cross section of the functional layer, a total area of the pores subjected to thickness orientation with respect to the total area of all the pores present in the cross section has a lower limit that is preferably not less than 3% by area, and more preferably not less than 3.5% by area. In the cross section of the functional layer, the total area of the pores subjected to thickness orientation with respect to the total area of all the pores present in the cross section has an upper limit that is, for example, not more than 40% by area or not more than 35% by area.

The maximum Feret diameter of a pore in the cross section of the functional layer, the minimum Feret diameter of a pore in the cross section of the functional layer, and the angle at which a pore in the cross section of the functional layer takes on the maximum Feret diameter are measured by image analysis of a cross-sectional SEM image.

The pores subjected to thickness orientation are each a pore that is not easily closed even when the functional layer is compressed. The pores subjected to thickness orientation can maintain ion permeability even after the functional layer is compressed. It is therefore considered that the functional layer in which the area ratio of the pores subjected to thickness orientation is in the above specific range is less likely to have great electrode resistance even when the functional layer is compressed.

Note that the pores subjected to thickness orientation have better liquid absorbency because such pores guide a liquid into the functional layer. It is therefore considered that the electrolyte has a small contact angle in the functional layer in which the area ratio of the pores subjected to thickness orientation is in the above specific range.

The functional layer in which the area ratio of the pores subjected to thickness orientation is in the above specific range can keep the electrode resistance low after the functional layer is compressed. For example, the electrode resistance is not more than 2.7Ω after the laminated separator is subjected to pressure application at 20 MPa. A method for measuring the electrode resistance is identical to a method described in Examples of the present application.

In the functional layer in which the area ratio of the pores subjected to thickness orientation is in the above specific range, the contact angle of the electrolyte is small because the electrolyte has high liquid absorbency. For example, the contact angle is not more than 9.5° or not more than 9°. The contact angle of the electrolyte may be 0°. A method for measuring the contact angle of the electrolyte is identical to a method described in Examples of the present application.

[5. Method for Producing Functional Layer]

The functional layer can be formed with use of, for example, a coating solution obtained by dissolving or dispersing the binder resin, the filler, and optionally one or more other components in a solvent. Specifically, the functional layer can be formed by applying the coating solution to the polyolefin base material and drying the coating solution.

Examples of a method for preparing the coating solution include mechanical stirring, ultrasonic dispersion, high-pressure dispersion, and media dispersion. Examples of the solvent of the coating solution include N-methylpyrrolidone, N,N-dimethylacetamide, and N,N-dimethylformamide.

Examples of a method for coating the polyolefin base material with the coating solution include a knife coater method, a blade coater method, a bar coater method, a gravure coater method, and a die coater method.

A drying method is not limited to any specific means provided that the solvent can be sufficiently removed. Examples of the drying method include natural drying, air-blow drying, heat drying, and drying under reduced pressure. The solvent contained in the coating solution may be dried after being replaced with another solvent. Specific examples of such a drying method include a method in which the solvent contained in the coating solution is replaced with a poor solvent having a low boiling point, such as water, alcohol, or acetone, the functional layer is deposited, and then the solvent is dried.

High-pressure dispersion is preferably carried out during preparation of the coating solution. According to such a production method, improvement in dispersibility of the filler makes it easy for an area ratio of large-diameter pores of a resulting functional layer to be in the above specific range. Pressure in high-pressure dispersion has a lower limit that is preferably not less than 1 MPa, and more preferably not less than 5 MPa. The pressure in high-pressure dispersion has an upper limit that is preferably not more than 100 MPa, and more preferably not more than 70 MPa. When the pressure in high-pressure dispersion is in the above range, it is easy for an area ratio of large-diameter pores of a resulting functional layer to be in the above specific range.

High-pressure dispersion is a method for dispersing components with use of, for example, a shearing force exerted when a fluid to which a high pressure has been applied flows through a narrow gap at a high speed, and/or a colliding force exerted when a high speed fluid is hit against a wall. High-pressure dispersion can be carried out, for example, with use of a high-pressure homogenizer.

The polyolefin base material is preferably impregnated with a solvent before the coating solution is applied to the polyolefin base material. Such a production method makes it difficult for the coating solution to be impregnated into the polyolefin base material. This prevents blockage of pores in the polyolefin base material by the functional layer, causes the resulting functional layer to have lower air permeability, and makes it easy to produce a functional layer whose area ratio of the large-diameter pores is in the above specific range.

The solvent with which the polyolefin base material is impregnated is preferably identical to the solvent of the coating solution. For example, when the solvent of the coating solution is N-methyl-2-pyrrolidone, N-methyl-2-pyrrolidone is preferably impregnated with the polyolefin base material before the coating solution is applied. A surface of the polyolefin base material to which surface the coating solution is applied is different from a surface of the polyolefin base material to which surface the solvent is applied.

A deposition method is preferably a method in which the functional layer is deposited from the coating solution by spraying a poor solvent and saturating air in a deposition tank with vapor of the poor solvent. Such a production method makes it easy for an area ratio of large-diameter pores of a resulting functional layer to be in the above specific range. A period of time during which the coating solution is staying in the deposition tank has a lower limit that is preferably not less than 1 second, and more preferably not less than 5 seconds. The period of time during which the coating solution is staying in the deposition tank has an upper limit that is preferably not more than 60 seconds, and more preferably not more than 50 seconds. When the period of time during which the coating solution is staying in the deposition tank is in the above range, it is easy to produce a functional layer whose area ratio of the large-diameter pores is in the above specific range. The poor solvent can be sprayed with use of, for example, a two-fluid nozzle.

[6. Nonaqueous Electrolyte Secondary Battery Laminated Separator]

A nonaqueous electrolyte secondary battery laminated separator including a nonaqueous electrolyte secondary battery functional layer in accordance with an embodiment of the present invention is also an embodiment of the present invention. The nonaqueous electrolyte secondary battery laminated separator (hereinafter also referred to as "laminated separator") in accordance with an embodiment of the present invention includes the polyolefin base material and the functional layer. The laminated separator includes the functional layer that is formed on one surface or both surfaces of the polyolefin base material.

In addition to the polyolefin base material and the functional layer, the laminated separator may have another layer as necessary. Examples of such a layer include an adhesive layer and a protective layer.

The laminated separator has a thickness of preferably not more than 25 μm, and more preferably not more than 20 μm.

The functional layer has a thickness of preferably not more than 10 μm, more preferably not more than 9 μm, and still more preferably not more than 8 μm.

[7. Polyolefin Base Material]

The laminated separator includes the polyolefin base material. Many pores connected to one another are present inside the polyolefin base material. This enables a gas and a liquid to flow from one side to the other side of the polyolefin base material.

The polyolefin base material may impart a shutdown function to the laminated separator. The shutdown function is a function to, when a battery generates heat, melt and make the laminated separator non-porous.

The "polyolefin base material" herein contains a polyolefin-based resin as a main component. The phrase "containing a polyolefin-based resin as a main component" herein means that the polyolefin-based resin is contained in the polyolefin base material at a proportion of not less than 50% by volume of all materials constituting the polyolefin base material. The proportion is preferably not less than 90% by volume, and more preferably not less than 95% by volume.

The polyolefin-based resin which the polyolefin base material contains as the main component is not particularly limited. Examples of the polyolefin-based resin include polymers that are each obtained by polymerizing a monomer(s) such as ethylene, propylene, 1-butene, 4-methyl-1-pentene, and/or 1-hexene. The polyolefin-based resin may be a homopolymer or may be a copolymer. Examples of the homopolymer include polyethylene, polypropylene, and polybutene. Examples of the copolymer include an ethylene-propylene copolymer. In order to increase compressive resistance of the base material, the polyolefin-based resin may also contain silane-modified polyolefin that can be silane-crosslinked. The polyolefin base material may contain only one type or two or more types of the above polyolefin-based resins.

In order to impart the shutdown function to the polyolefin base material, the polyolefin-based resin is more preferably polyethylene, and particularly preferably high molecular weight polyethylene. The polyolefin base material may contain a component other than polyolefin, provided that the component does not impair the function of the polyolefin base material.

Examples of the polyethylene include low-density polyethylene, high-density polyethylene, linear polyethylene (ethylene-α-olefin copolymer), and ultra-high molecular weight polyethylene. Among these examples, ultra-high molecular weight polyethylene is preferable. Furthermore, polyethylene that contains high molecular weight components each having a weight-average molecular weight of $5\times10^5$ to $15\times10^6$ is more preferable. Polyethylene that contains high molecular weight components each having a weight-average molecular weight of not less than 1,000,000 allows an increase in strength of the polyolefin base material and the laminated separator.

The thickness of the polyolefin base material has a lower limit that is preferably not less than 5 μm, more preferably not less than 7 μm, and still more preferably not less than 9 μm. The thickness of the polyolefin base material has an upper limit that is preferably not more than 20 μm, and more preferably not more than 15 μm. The polyolefin base material that has a thickness of not less than 5 μm makes it possible to sufficiently achieve functions that are required of the polyolefin base material, such as the shutdown function. The polyolefin base material that has a thickness of not more than 20 μm makes it possible to achieve a thinner laminated separator.

The pores in the polyolefin base material each have a diameter of preferably not more than 0.1 μm, and more preferably not more than not more than 0.06 μm. When the diameter of a pore is in the above range, it is possible to achieve sufficient ion permeability. It is also possible to successfully prevent particles, which constitute an electrode, from entering the polyolefin base material.

A weight per unit area of the polyolefin base material has a lower limit that is preferably not less than 4 $g/m^2$, and more preferably not less than 5 $g/m^2$. The weight per unit area of the polyolefin base material has an upper limit that is preferably not more than 20 $g/m^2$, and more preferably not more than 12 $g/m^2$. The weight per unit area that is in the above range enables a battery to have a higher weight energy density and a higher volume energy density.

The air permeability (Gurley value) of the polyolefin base material has a lower limit that is preferably not less than 30 s/100 mL, and more preferably not less than 50 s/100 mL. The air permeability (Gurley value) of the polyolefin base material has an upper limit that is preferably not more than 500 s/100 mL, and more preferably not more than 300 s/100 mL. The air permeability (Gurley value) that is in the above range enables the laminated separator to obtain sufficient ion permeability.

The porosity of the polyolefin base material has a lower limit that is preferably not less than 20% by volume, and more preferably not less than 30% by volume. The porosity of the polyolefin base material has an upper limit that is preferably not more than 80% by volume, and more preferably not more than 75% by volume. The porosity that is in the above range enables the electrolyte to be retained in a larger amount. The porosity that is in the above range also allows the shutdown function to be carried out at a lower temperature.

A method for producing the polyolefin base material is not limited to any particular method, and a publicly known method can be employed. For example, it is possible to employ a method that involves adding a filler to a thermoplastic resin, forming a resulting mixture into a film, and then removing the filler (see Japanese Patent No. 5476844).

Specific examples include a case where the polyolefin base material is made of a polyolefin-based resin containing ultra-high molecular weight polyethylene and low molecular weight polyolefin that has a weight-average molecular weight of not more than 10,000. In this case, from the viewpoint of production cost, the polyolefin base material is preferably produced by a method including the following steps 1 to 4:

1. kneading 100 parts by weight of an ultra-high molecular weight polyethylene, 5 parts by weight to 200 parts by weight of a low molecular weight polyolefin having a weight-average molecular weight of not more than 10,000, and 100 parts by weight to 400 parts by weight of an inorganic filler such as calcium carbonate so as to obtain a polyolefin-based resin composition;
2. forming the polyolefin-based resin composition into a sheet;
3. removing the inorganic filler from the sheet obtained in step 2; and
4. stretching the sheet obtained in step 3.

Alternatively, the polyolefin base material may be produced by a method disclosed in the above-listed Patent Literature. Alternatively, a commercially available product that has the above-described characteristics may be used as the polyolefin base material.

[8. Ratio of Contact Between Polyolefin Base Material and Filler]

A ratio of contact between the polyolefin base material and the filler that is contained in the functional layer and that has a particle diameter of not less than 0.1 μm is preferably not more than 7% in the laminated separator. The filler that has a particle diameter of not less than 0.1 μm preferably has a volume fraction of not less than 15% by volume in the functional layer. More preferably, the ratio of contact between the polyolefin base material and the filler that is contained in the functional layer and that has a particle diameter of not less than 0.1 μm is not more than 7% in the laminated separator, and the filler that has a particle diameter of not less than 0.1 μm has a volume fraction of not less than 15% by volume in the functional layer.

According to the laminated separator in which the ratio of contact of the filler that has a particle diameter of not less than 0.1 μm with the polyolefin base material is in the above specific range, it is possible to achieve both maintenance of sufficient air permeability and maintenance of voltage resistance during compression.

[8.1. Filler Having Particle Diameter of not Less than 0.1 μm]

The functional layer preferably contains the filler (submicron- to micron-sized filler) that has a particle diameter of not less than 0.1 μm. Assuming that the amount of all the materials constituting the functional layer is 100% by volume, the volume fraction of the filler that has a particle diameter of not less than 0.1 μm has a lower limit that is preferably not less than 15%. When the volume fraction of the filler that has a particle diameter of not less than 0.1 μm is not less than 15%, the air permeability (Gurley value) of the functional layer and the laminated separator can be maintained in a sufficiently low range. The volume fraction of the filler that has a particle diameter of not less than 0.1 μm has an upper limit that is, for example, not more than 60%, not more than 55%, not more than 50%, or not more than 45%. When the volume fraction of the filler that has a particle diameter of 0.1 μm is not more than 60%, powder falling is prevented or reduced.

[8.2. Ratio of Contact of Filler Having Particle Diameter of not Less than 0.1 μm with Polyolefin Base Material]

Figure 3:
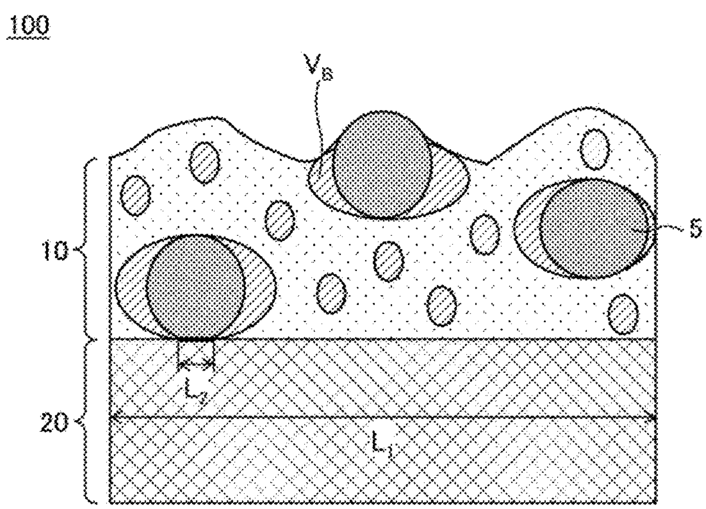
FIG. 3 is a schematic view for describing, in an embodiment of the present invention, a part in which a polyolefin base material and a filler are in contact with each other.

The ratio of contact of the filler that has a particle diameter of not less than 0.1 μm with the polyolefin base material will be described with reference to exemplary FIG. 3. A laminated separator 100 includes a functional layer 10 and a polyolefin base material 20. The functional layer 10 preferably contains a filler 5 that has a particle diameter of not less than 0.1 μm. The functional layer 10 may contain a filler that has a particle diameter of less than 0.1 μm. The functional layer 10 is in contact with the polyolefin base material 20, and an interface between the functional layer and the polyolefin base material 20 has a length of $L_1$. A filler **5*a* that has a particle diameter of not less than 0.1 μm also has a part which is in contact with the polyolefin base material 20**, the part having a length of $L_2$. In this case, the ratio of contact of the filler that has a particle diameter of not less than 0.1 μm with the polyolefin base material is given by $L_2/L_1 \times 100$.

The ratio of contact of the filler that has a particle diameter of not less than 0.1 μm with the polyolefin base material has an upper limit that is preferably not more than 7%, and more preferably not more than 6.8%. The ratio of contact of the filler that has a particle diameter of not less than 0.1 μm with the polyolefin base material has a lower limit that is, for example, not less than 0.5% or not less than 0.7%.

When the ratio of contact of the filler that has a particle diameter of not less than 0.1 μm with the polyolefin base material is in the above specified range, the filler that has a particle diameter of not less than 0.1 μm is in almost no contact with the polyolefin base material, and most of a surface of the filler is located in a matrix of the functional layer. It is therefore considered that when the laminated separator is compressed, the filler is less likely to damage the base material, and voltage resistance can be maintained. Furthermore, since it is possible to maintain voltage resistance without changing the volume fraction of the filler contained in the functional layer, the air permeability (Gurley value) can also be kept low.

The laminated separator in which the ratio of contact of the filler that has a particle diameter of not less than 0.1 pm with the polyolefin base material satisfies the above specified range makes it possible to achieve sufficient air permeability during uncompression and keep voltage resistance high during compression. For example, the air permeability (Gurley value) of the laminated separator during uncompression is not more than 250 s/100 mL or not more than 240 s/100 mL. For example, when the functional layer of the laminated separator is subjected to 2 μm compression, a limit withstand voltage maintenance rate is not less than 65% or not less than 70%. A method for measuring the air permeability during uncompression and the limit withstand voltage maintenance rate is identical to the method described in Examples of the present application.

[9. Interface Distance Between Functional Layer and Polyolefin Base Material]

The laminated separator that has been subjected to pressure application at 20 MPa preferably satisfies a condition as defined by the following expression: Interface distance between functional layer and polyolefin base material/direct distance from one end to other end of interface between functional layer and polyolefin base material≥1.005

According to the laminated separator whose interface distance/direct distance is in the above specific range after the laminated separator is subjected to pressure application at 20 MPa, it is possible to reduce a reduction in discharge capacity after cycles even in a state in which the laminated separator is compressed.

[9.1. Interface Distance and Direct Distance]

Figure 4:
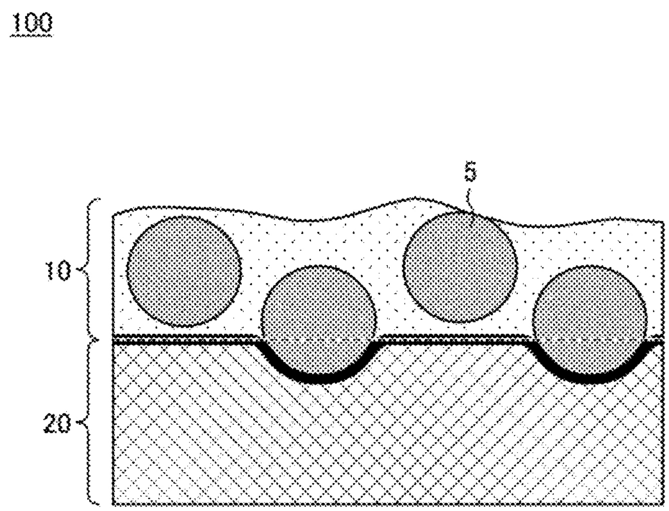
FIG. 4 is a schematic view for describing, in an embodiment of the present invention, an interface distance and a direct distance between a functional layer and a polyolefin base material.

The interface distance and the direct distance will be described with reference to exemplary FIG. 4. A laminated separator 100 includes a functional layer 10 and a polyolefin base material 20. In the example of FIG. 4, the functional layer 10 contains a filler 5.

The interface distance is the length of an interface between the functional layer 10 and the polyolefin base material 20. The direct distance is the length of a line joining one end and the other end of the interface. An end of the interface is, for example, an end in a field of view of a SEM image. When the laminated separator 100 is subjected to pressure application at 20 MPa, the interface between the functional layer 10 and the polyolefin base material 20 is curved by the functional layer 10 being pressed in (a thick line). In contrast, the direct distance hardly changes before and after pressure application (a dashed line).

The interface distance in the laminated separator which has been subjected to pressure application at 20 MPa has a lower limit that is preferably not less than 1.005 times the direct distance. The interface distance in the laminated separator which has been subjected to pressure application at 20 MPa has an upper limit that is, for example, not more than 1.040 times, not more than 1.035 times, or not more than 1.030 times the direct distance. It can be said that the interface distance in such a laminated separator has been extended after pressure application. Thus, even when the laminated separator is subjected to pressure application, the extended interface distance enables dispersion of a stress on the polyolefin base material. This makes it possible to prevent a break in the polyolefin base material.

According to the laminated separator whose interface distance/direct distance is in the above specific range after the laminated separator is subjected to pressure application at 20 MPa, it is possible to achieve a higher high-rate discharge capacity during compression after cycles during compression. For example, the 5 C discharge capacity in the 60th cycle is, for example, not less than 7.5 mAh or 8.0 mAh after the laminated separator is subjected to pressure application at 20 MPa. A method for measuring the discharge capacity after cycles is identical to a method described in Examples of the present application.

The interface distance in the laminated separator during uncompression has a length that is preferably not more than 1.004 times or not more than 1.003 times the length of the direct distance. That is, it is preferable that the interface between the functional layer and the polyolefin base material be hardly curved during uncompression and be curved after the laminated separator is subjected to pressure application at 20 MPa.

[10. Compressibilities of Functional Layer and Polyolefin Base Material]

The functional layer has a compressibility of preferably not less than 15% after the laminated separator is subjected to pressure application at 20 MPa. The polyolefin base material has a compressibility of preferably not more than 5% after the laminated separator is subjected to pressure application at 20 MPa. More preferably, after the nonaqueous electrolyte secondary battery laminated separator is subjected to pressure application at 20 MPa, the functional layer has a compressibility of not less than 15%, and the polyolefin base material has a compressibility of not more than 5%.

The laminated separator in which the compressibility of the functional layer is in the above specific range or the compressibilities of the functional layer and the polyolefin base material are in the above respective specific ranges makes it possible to reduce an increase in alternating-current resistance after compression.

[10.1. Compressibility]

The compressibility is calculated from the thickness before and after application of a pressure of 20 MPa. Specifically, the compressibility is given by the following expression: "(1−thickness after pressure release (μm)/thickness before pressure application (μm))×100". Assuming that the thickness in the above expression is the thickness of the functional layer, the compressibility of the functional layer is given. Assuming the thickness in the above expression is the thickness of the polyolefin base material, the compressibility of the polyolefin base material is given.

The compressibility is calculated on the basis of the thickness in a state of release from pressure application with a press. In this respect, the compressibility described above is different from a compressibility during pressure application in [11. Springback of functional layer] described later. The compressibility during pressure application is calculated on the basis of the thickness in a state under pressure.

In the laminated separator in which the functional layer has a compressibility of not less than 15% and the polyolefin base material has a compressibility of not more than 5%, the functional layer is more easily compressed than the polyolefin base material. That is, when pressure is applied, the functional layer is preferentially compressed, and compression of the polyolefin base material is reduced. It is therefore considered that an increase in alternating-current resistance caused by compression of the polyolefin base material can be reduced.

The compressibility of the functional layer has a lower limit that is preferably not less than 15%, more preferably not less than 17%, and still more preferably not less than 19%. The compressibility of the functional layer has an upper limit that is, for example, not more than 90% or not more than 80%. The compressibility of the polyolefin base material has an upper limit that is preferably not more than 5%, and more preferably not more than 4%. The lower limit of the compressibility of the polyolefin base material is, for example, not less than 0% or not less than 1%.

The thicknesses of the functional layer and the polyolefin base material are measured by image analysis of a cross-sectional SEM image.

The laminated separator in which the compressibility of the functional layer is in the above specific range or the compressibilities of the functional layer and the polyolefin base material are in the above respective specific ranges makes it possible to reduce an increase in alternating-current resistance during compression. For example, the increase in alternating-current resistance is not more than 110% when the functional layer of the laminated separator is subjected to 2 μm compression. A method for measuring the alternating-current resistance is identical to a method described in Examples of the present application.

[11. Springback of Functional Layer]

In the laminated separator, the functional layer preferably has an elastic recovery rate of not more than 20% in a state of release from pressure application at 20 MPa. The functional layer preferably has a compressibility during pressure application of not less than 20% in a state of pressure application at 20 MPa. More preferably, the functional layer has a compressibility during pressure application of not less than 20% in the state of pressure application at 20 MPa, and has an elastic recovery rate of not more than 20% in the state of release from pressure application at 20 MPa.

The functional layer whose elastic recovery rate is in the above specific range makes it possible to reduce an elastic force of the functional layer after pressure application, and to reduce a deterioration in battery.

[11.1. Compressibility During Pressure Application, Post-Release Recovery Rate, and Elastic Recovery Rate]

The compressibility during pressure application is herein a parameter calculated by "compression amount during pressure application/thickness before pressure application×100". The compressibility during pressure application is an indicator that indicates, on the basis of the thickness before pressure application, a degree to which the thickness is compressed during application of pressure. The thickness and the compression amount during pressure application each can be measured for the functional layer, the polyolefin base material, and the laminated separator. This makes it possible to define the compressibility during pressure application of the functional layer, the compressibility during pressure application of the polyolefin base material, and the compressibility during pressure application of the laminated separator.

The post-release recovery rate is herein a parameter calculated by "amount of recovery after pressure release/thickness before pressure application×100". The post-release recovery rate is an indicator that indicates, on the basis of the thickness before pressure application, a degree to which the thickness is recovered in response to release from pressure. The thickness and the post-release recovery amount each can be measured for the functional layer, the polyolefin base material, and the laminated separator. This makes it possible to define the post-release recovery rate of the functional layer, the post-release recovery rate of the polyolefin base material, and the post-release recovery rate of the laminated separator.

The elastic recovery rate is herein a parameter calculated by "amount of recovery after pressure release/compression amount during pressure application×100". The elastic recovery rate is an indicator that indicates, on the basis of the compression amount during pressure application, a degree to which the thickness is recovered in response to release from pressure. The compression amount during pressure application and the post-release recovery amount each can be measured for the functional layer, the polyolefin base material, and the laminated separator. This makes it possible to define the elastic recovery rate of the functional layer, the elastic recovery rate of the polyolefin base material, and the elastic recovery rate of the laminated separator.

The compression amount during pressure application and the post-release recovery amount of the functional layer are calculated as differences in compression amount during pressure application and post-release recovery amount, respectively, between the laminated separator and the polyolefin base material. Specifically, the difference in compression amount during pressure application between the laminated separator and the polyolefin base material is the compression amount during pressure application of the functional layer. The difference in post-release recovery amount between the laminated separator and the polyolefin base material is the post-release recovery amount of the functional layer.

The polyolefin base material that is used for the above measurements may be a polyolefin base material before formation of the functional layer, or a polyolefin base material after separation of the functional layer from the laminated separator.

The compressibility during pressure application is calculated on the basis of the thickness in a state under pressure. In this respect, the compressibility during pressure application is different from the compressibilities in [10. Compressibilities of functional layer and polyolefin base material].

The compressibility is calculated on the basis of the thickness in a state of release from pressure application with a press.

The compressibility during pressure application of the functional layer in the state of pressure application at 20 MPa has a lower limit that is preferably not less than 20%. The compressibility during pressure application has an upper limit that is, for example, not more than 50% or not more than 45%.

The elastic recovery rate of the functional layer in the state of release from pressure application at 20 MPa has an upper limit that is preferably not more than 20%, and more preferably not more than 18%. The elastic recovery rate has a lower limit that is, for example, not less than 3% or not less than 5%.

The functional layer whose elastic recovery rate is in the above specific range has less springback after release from pressure application. This results in a small restoring force which is caused when the functional layer is subjected to pressure application in a battery and by which the functional layer is to return to its original shape. This makes it possible to reduce a deterioration in battery while keeping low an internal pressure of the battery.

The compressibility during pressure application and the elastic recovery rate of the functional layer are measured by applying a pressure of 20 MPa. A pressure of 20 MPa is classified as a high pressure in a test for evaluating properties of a separator. Conventionally, tests for evaluating properties of a separator at a lower pressure have been reported. However, a physical property (springback) and an effect (capacity recovery rate) of the functional layer cannot be expected from results of these tests. This is due to a substantial difference in pressure applied.

The compression amount during pressure application of the functional layer is preferably not less than 1.0 μm, and more preferably not less than 1.4 μm or not less than 1.6 μm. It can be said that when the compression amount during pressure application is in the above range, the functional layer sufficiently contracts with respect to an increase in pressure.

The functional layer whose elastic recovery rate is in the above specific range has a relatively high capacity recovery rate (%) after cycles after pressure application. For example, the capacity recovery rate obtained after carrying out 5C discharge and a 60-cycle cycle test after 20 MPa pressure application has a lower limit that is not less than 90%. The capacity recovery rate has an upper limit that is, for example, not more than 96% or not more than 94%. The capacity recovery rate is calculated by "0.2 C discharge capacity after cycles/0.2 C discharge capacity before cycles×100". A method for measuring the capacity recovery rate is identical to a method described in Examples of the present application.

An apparatus that is used herein to compress the functional layer, the polyolefin base material, or the laminated separator at 20 MPa is a pressing machine (a mechanical pressing machine, a hydraulic pressing machine, or the like).

[12. Method for Producing Laminated Separator]

The coating solution for forming the functional layer is applied to the polyolefin base material and dried, so that the functional layer can be formed, and the laminated separator including the polyolefin base material and the functional layer can be produced. Specifically, the laminated separator can be produced by a method identical to the method described in [5. Method for producing functional layer].

[13. Nonaqueous Electrolyte Secondary Battery Member and Nonaqueous Electrolyte Secondary Battery]

A member for a nonaqueous electrolyte secondary battery (hereinafter referred to as a "nonaqueous electrolyte secondary battery member") including a separator for a nonaqueous electrolyte secondary battery (hereinafter referred to as a "nonaqueous electrolyte secondary battery separator") in accordance with an embodiment of the present invention is also an embodiment of the present invention. A nonaqueous electrolyte secondary battery member in accordance with an embodiment of the present invention includes a positive electrode, the above-described nonaqueous electrolyte secondary battery laminated separator, and a negative electrode that are disposed in this order. A nonaqueous electrolyte secondary battery including the nonaqueous electrolyte secondary battery separator in accordance with an embodiment of the present invention is also an embodiment of the present invention. The nonaqueous electrolyte secondary battery includes the above-described nonaqueous electrolyte secondary battery laminated separator. The nonaqueous electrolyte secondary battery ordinarily includes the nonaqueous electrolyte secondary battery member. In the nonaqueous electrolyte secondary battery, the nonaqueous electrolyte secondary battery member that is impregnated with an electrolyte is ordinarily enclosed in an exterior member. The nonaqueous electrolyte secondary battery may be a lithium ion secondary battery that achieves an electromotive force through doping with and dedoping of lithium ions.

[13.1. Positive Electrode]

For example, a positive electrode sheet may be used as the positive electrode. In the positive electrode sheet, an active material layer that contains a positive electrode active material and a binding agent is formed on a current collector. The active material layer may further contain an electrically conductive agent.

Examples of the positive electrode active material include materials each capable of being doped with and dedoped of lithium ions. Examples of such materials include lithium complex oxides each containing at least one type of transition metal such as V, Ti, Cr, Mn, Fe, Co, Ni, and/or Cu. Examples of the lithium complex oxides include lithium complex oxides each having a layer structure, lithium complex oxides each having a spinel structure, and solid solution lithium-containing transition metal oxides (each constituted by a lithium complex oxide having both a layer structure and a spinel structure). Further examples of the lithium complex oxides include lithium cobalt complex oxides and lithium nickel complex oxides. Furthermore, examples of the lithium complex oxides also include substances each obtained by substituting one or more of transition metal atoms, which are contained in any of the above lithium complex oxides, with another or other elements such as Na, K, B, F, Al, Ti, V, Cr, Mn, Fe, Co, Ni, Cu, Zn, Mg, Ca, Ga, Zr, Si, Nb, Mo, Sn, and/or W.

Examples of the lithium complex oxides each obtained by substituting one or more of the transition metal atoms, which are contained in any of the lithium complex oxides, with another or other elements include substances represented by the following Formulae (A) to (D). The substance represented by Formula (A) is a lithium cobalt complex oxide having a layer structure. The substance represented by Formula (B) is a lithium nickel complex oxide. The substance represented by Formula (C) is a lithium manganese complex oxide having a spinel structure. The substance represented by Formula (D) is a solid solution lithium-containing transition metal oxide.

$$Li[Li_x(Co_{1-a}M^1_a)_{1-x}]O_2 \quad (A)$$

where: $M^1$ is at least one type of metal selected from the group consisting of Na, K, B, F, Al, Ti, V, Cr, Mn, Fe, Ni, Cu, Zn, Mg, Ga, Zr, Si, Nb, Mo, Sn, and W; x satisfies $-0.1 \leq x \leq 0.30$; and a satisfies $0 \leq a \leq 0.5$.

$$Li[Li_y(Ni_{1-b}M^2_b)_{1-y}]O_2 \quad (B)$$

where: $M^2$ is at least one type of metal selected from the group consisting of Na, K, B, F, Al, Ti, V, Cr, Mn, Fe, Co, Cu, Zn, Mg, Ga, Zr, Si, Nb, Mo, Sn, and W; y satisfies $-0.1 \leq y \leq 0.30$; and b satisfies $0 \leq b \leq 0.5$.

$$Li_zMn_{2-c}M^3_cO_4 \quad (C)$$

where: $M^3$ is at least one type of metal selected from the group consisting of Na, K, B, F, Al, Ti, V, Cr, Fe, Co, Ni, Cu, Zn, Mg, Ga, Zr, Si, Nb, Mo, Sn, and W; z satisfies $0.9 \leq z$; and c satisfies $0 \leq c \leq 1.5$.

$$Li_{1+w}M^4_dM^5_eO_2 \quad (D)$$

where: $M^4$ and $M^5$ are each independently at least one type of metal selected from the group consisting of Al, Ti, V, Cr, Mn, Fe, Co, Ni, Cu, Zn, Mg, and Ca; w, d, and e satisfy $0 < w \leq 1/3$, $0 \leq d \leq 2/3$, $0 \leq e \leq 2/3$, and $w+d+e=1$.

Specific examples of the lithium complex oxides represented by Formulae (A) to (D) include $LiCoO_2$, $LiNiO_2$, $LiMnO_2$, $LiNi_{0.8}Co_{0.2}O_2$, $LiNi_{0.5}Mn_{0.5}O_2$, $LiNi_{0.85}Co_{0.10}Al_{0.05}O_2$, $LiNi_{0.8}Co_{0.15}Al_{0.05}O_2$, $LiNi_{0.5}Co_{0.2}Mn_{0.3}O_2$, $LiNi_{0.6}Co_{0.2}Mn_{0.2}O_2$, $LiNi_{0.33}Co_{0.33}Mn_{0.33}O_2$, $LiMn_2O_4$, $LiMn_{1.5}Ni_{0.5}O_4$, $LiMn_{1.5}Fe_{0.5}O_4$, $LiCoMnO_4$, $Li_{1.21}Ni_{0.20}Mn_{0.59}O_2$, $Li_{1.22}Ni_{0.20}Mn_{0.58}O_2$, $Li_{1.22}Ni_{0.15}Co_{0.10}Mn_{0.53}O_2$, $Li_{1.07}Ni_{0.35}Co_{0.08}Mn_{0.50}O_2$, and $Li_{1.07}Ni_{0.36}Co_{0.08}Mn_{0.49}O_2$.

As a matter of course, a lithium complex oxide other than the lithium complex oxides represented by Formulae (A) to (D) can also be suitably used as the positive electrode active material. Examples of such a lithium complex oxide include $LiNiVO_4$, $LiV_3O_6$, and $Li_{1.2}Fe_{0.4}Mn_{0.4}O_2$.

Examples of a substance that is different from a lithium complex oxide and that can be suitably used as the positive electrode active material include phosphates each having an olivine structure. Examples of such phosphates include substances represented by the following Formula (E):

$$Li_v(M^6_fM^7_gM^8_hM^9_i)_jPO_4 \quad (E)$$

where: $M^6$ is Mn, Co, or Ni; $M^7$ is Ti, V, Cr, Mn, Fe, Co, Ni, Zr, Nb, or Mo; $M^8$ is a transition metal or a typical element (optionally, $M^8$ is not an element of groups VIA and VIIA); $M^9$ is a transition metal or a typical element (optionally, $M^9$ is not an element of groups VIA and VIIA); and a to f satisfy $1.2 \geq a \geq 0.9$, $1 \geq b \geq 0.6$, $0.4 \geq c \geq 0$, $0.2 \geq d \geq 0$, $0.2 \geq e \geq 0$, and $1.2 \geq f \geq 0.9$.

The positive electrode active material preferably has a coating layer on a surface thereof. For example, each of particles of the lithium-metal complex oxide preferably has a coating layer on a surface thereof. Examples of a material of which the coating layer is made include metal complex oxides, metal salts, boron-containing compounds, nitrogen-containing compounds, silicon-containing compounds, and sulfur-containing compounds.

Among the above-listed examples, metal complex oxides are preferable. Examples of the metal complex oxides include metal complex oxides each having lithium ion conductivity. Examples of the metal complex oxides each having lithium ion conductivity include metal complex oxides of Li and at least one type of element selected from the group consisting of Nb, Ge, Si, P, Al, W, Ta, Ti, S, Zr, Zn, V, and B.

The positive electrode active material that has the coating layer makes it possible to prevent or reduce a side reaction that occurs at an interface between the positive electrode active material and the electrolyte under a high voltage. This achieves a longer life of a secondary battery. Furthermore, the positive electrode active material that has the coating layer makes it possible to prevent or reduce formation of a high-resistance layer at the interface between the positive electrode active material and the electrolyte. This achieves a higher output of the secondary battery.

Examples of the electrically conductive agent include carbonaceous materials. Examples of the carbonaceous materials include natural graphite, artificial graphite, cokes, carbon black, pyrolytic carbons, carbon fibers, and fired products of organic polymer compounds.

Examples of the binding agent include polyvinylidene fluoride, vinylidene fluoride copolymers, polytetrafluoroethylene, vinylidene fluoride-hexafluoropropylene copolymers, tetrafluoroethylene-hexafluoropropylene copolymers, tetrafluoroethylene-perfluoroalkyl vinyl ether copolymers, ethylene-tetrafluoroethylene copolymers, vinylidene fluoride-tetrafluoroethylene copolymers, vinylidene fluoride-trifluoroethylene copolymers, vinylidene fluoride-trichloroethylene copolymers, vinylidene fluoride-vinyl fluoride copolymers, vinylidene fluoride-hexafluoropropylene-tetrafluoroethylene copolymers, thermoplastic resins (such as thermoplastic polyimide, polyethylene, and polypropylene), acrylic resins, and styrene-butadiene rubber. The binding agent may also function as a thickener.

Examples of the positive electrode current collector include electric conductors such as Al, Ni, and stainless steel. Among these electric conductors, Al is preferable because Al is easily processed into a thin film and is inexpensive.

Examples of a method for producing the positive electrode in sheet form include the following:

- a production method that involves pressure-molding, on the positive electrode current collector, the positive electrode active material, the electrically conductive agent, and the binding agent to form a positive electrode mix on the positive electrode current collector; and
- a production method that involves coating the positive electrode current collector with the positive electrode mix in paste form, drying the positive electrode mix, and applying pressure to the resulting positive electrode mix in sheet form so as to firmly fix the positive electrode mix to the positive electrode current collector. The positive electrode mix in paste form is prepared by mixing the positive electrode active material, the electrically conductive agent, and the binding agent with an appropriate organic solvent.

[13.2. Negative Electrode]

For example, a negative electrode sheet may be used as the negative electrode. In the negative electrode sheet, an active material layer that contains a negative electrode active material and a binding agent is formed on a current collector. The active material layer may further contain an electrically conductive agent.

Examples of the negative electrode active material include materials each capable of being doped with and dedoped of lithium ions at an electric potential lower than that of the positive electrode. Specific examples of such materials include carbon materials, chalcogen compounds (such as oxides and sulfides), nitrides, metal materials, and alloys.

Examples of the carbon materials include graphites (such as natural graphite and artificial graphite), cokes, carbon black, pyrolytic carbons, carbon fibers, and fired products of organic polymer compounds.

Examples of the oxides include: silicon oxides represented by a formula $SiO_x$ (where x is a positive real number), such as $SiO_2$ and $SiO_x$ titanium oxides represented by a formula $TiO_x$ (where x is a positive real number), such as $TiO_2$ and $TiO_x$ vanadium oxides represented by a formula $V_xO_y$ (where x and y are each a positive real number), such as $V_2O_5$ and $VO_2$; iron oxides represented by a formula $Fe_xO_y$ (where x and y are each a positive real number), such as $Fe_3O_4$, $Fe_2O_3$, and FeO; tin oxides represented by a formula SnO (where x is a positive real number), such as $SnO_2$ and SnO; tungsten oxides represented by a formula $WO_x$ (where x is a positive real number), such as $WO_3$ and $WO_2$; and complex metal oxides each of which contains lithium and titanium or vanadium, such as $Li_4Ti_5O_{12}$ and $LiVO_2$.

Examples of the sulfides include: titanium sulfides represented by a formula $Ti_xS_y$ (where x and y are each a positive real number), such as $Ti_2S_3$, $TiS_2$, and TiS; vanadium sulfides represented by a formula $VS_x$ (where x is a positive real number), such as $V_3S_4$, $VS_2$, and VS; iron sulfides represented by a formula $Fe_xS_y$ (where x and y are each a positive real number), such as $Fe_3S_4$, $FeS_2$, and FeS; molybdenum sulfides represented by a formula $Mo_xS_y$ (where x and y are each a positive real number), such as $Mo_2S_3$ and $MoS_2$; tin sulfides represented by a formula $SnS_x$ (where x is a positive real number), such as $SnS_2$ and SnS; tungsten sulfides represented by a formula $WS_x$ (where x is a positive real number), such as $WS_2$; antimony sulfides represented by a formula $Sb_xS_y$ (where x and y are each a positive real number), such as $Sb_2S_3$; and selenium sulfides represented by a formula $Se_xS_y$ (where x and y are each a positive real number), such as $Se_5S_3$, $SeS_2$, and SeS.

Examples of the nitrides include lithium-containing nitrides such as $Li_3N$ and $Li_{3-x}A_xN$ (where A is at least one selected from the group consisting of Ni and Co, and $0<x<3$ is satisfied).

The negative electrode active material may contain only one type or two or more types of the above-listed materials. The above-listed materials may be crystalline or may be amorphous. The above-listed materials are mainly supported by the negative electrode current collector so as to be used as the electrode.

Examples of a metal material include lithium metals, silicon metals, and tin metals.

Further examples of the negative electrode active material include a complex material. The complex material contains Si or Sn as a first constituent element and further contains a second constituent element and a third constituent element. Examples of the second constituent element include at least one type of element selected from the group consisting of cobalt, iron, magnesium, titanium, vanadium, chromium, manganese, nickel, copper, zinc, gallium, and zirconium. Examples of the third constituent element include at least one type of element selected from the group consisting of boron, carbon, aluminum, and phosphorus.

In particular, since a high battery capacity and an excellent battery characteristic are achieved, the metal material is preferably a simple substance of silicon or tin (that may contain a slight amount of impurities), SiO, ($0<v\leq 2$), $SnO_w$ ($0\leq w\leq 2$), an Si—Co—C complex material, an Si—Ni—C complex material, an Sn—Co—C complex material, or an Sn—Ni—C complex material.

Examples of the negative electrode current collector include Cu, Ni, and stainless steel. Cu is preferable particularly in a lithium-ion secondary battery. This is because Cu is not easily alloyed with Li and is more easily processed into a thinner film.

Examples of a method for producing the negative electrode in sheet form include the following: a production method that involves pressure-molding, on the negative electrode current collector, the negative electrode active material, the electrically conductive agent, and the binding agent to form a negative electrode mix on the negative electrode current collector; and a production method that involves coating the negative electrode current collector with the negative electrode mix in paste form, drying the negative electrode mix, and applying pressure to the resulting negative electrode mix in sheet form so as to firmly fix the negative electrode mix to the negative electrode current collector. The negative electrode mix in paste form is prepared by mixing the negative electrode active material, the electrically conductive agent, and the binding agent with an appropriate organic solvent.

[13.3. Nonaqueous Electrolyte]

Examples of the nonaqueous electrolyte include a nonaqueous electrolyte in which a lithium salt is dissolved in an organic solvent.

Examples of the lithium salt include $LiClO_4$, $LiPF_6$, $LiAsF_6$, $LiSbF_6$, $LiBF_4$, $LiSO_3F$, $LiCF_3SO_3$, $LiN(SO_2CF_3)_2$, $LiN(SO_2C_2F_5)_2$, $LiN(SO_2CF_3)(COCF_3)$, $Li(C_4F_9SO_3)$, $LiC(SO_2CF_3)_3$, $Li_2B_{10}Cl_{10}$, LiBOB (where BOB refers to bis(oxalato)borate), lower aliphatic carboxylic acid lithium salt, and $LiAlCl_4$. Only one type of lithium salt may be used. Alternatively, two or more types of lithium salts may be used. Preferably, the lithium salt contains a lithium salt containing fluorine. More preferably, the lithium salt contains at least one type of lithium salt selected from the group consisting of $LiPF_6$, $LiAsF_6$, $LiSbF_6$, $LiBF_4$, $LiSO_3F$, $LiCF_3SO_3$, $LiN(SO_2CF_3)_2$, and $LiC(SO_2CF_3)_3$.

Examples of the organic solvent include carbonates (such as propylene carbonate, ethylene carbonate, dimethyl carbonate, diethyl carbonate, ethyl methyl carbonate, 4-trifluoromethyl-1,3-dioxolane-2-on, and 1,2-di(methoxycarbonyloxy)ethane)); ethers (such as 1,2-dimethoxyethane, 1,3-dimethoxypropane, pentafluoropropyl methylether, 2,2,3,3-tetrafluoropropyl difluoromethylether, tetrahydrofuran, and 2-methyl tetrahydrofuran); esters (such as methyl formate, methyl acetate, and γ-butyrolactone); nitriles (such as acetonitrile and butyronitrile); amides (such as N,N-dimethylformamide and N,N-dimethylacetamide); carbamates (such as 3-methyl-2-oxazolidone); sulfur-containing compounds (such as sulfolane, dimethyl sulfoxide, and 1,3-propane sultone); and organic solvents each prepared by substituting one or more hydrogen atoms of any of these organic solvents with one or more respective fluorine atoms.

The organic solvent is preferably a mixed solvent obtained by mixing two or more types of organic solvents. The organic solvent is preferably a mixed solvent containing a carbonate. The organic solvent is more preferably a mixed solvent containing a cyclic carbonate and an acyclic carbonate or a mixed solvent containing a cyclic carbonate and an ether. Among mixed solvents each containing a cyclic carbonate and an acyclic carbonate, a mixed solvent containing ethylene carbonate, dimethyl carbonate, and ethyl methyl carbonate is preferable. The nonaqueous electrolyte that contains such a mixed solvent has advantages of having a wider operating temperature range, being less prone to deterioration even when used at a high voltage, being less prone to deterioration even when used for a long period of time, and being difficult to decompose with respect to a graphite negative electrode.

Other suitable examples of the organic solvent include a nonaqueous electrolyte containing a combination of (i) a lithium salt containing fluorine (such as $LiPF_6$) and (ii) an organic solvent containing a fluorine substituent. Such a nonaqueous electrolyte allows the resulting nonaqueous electrolyte secondary battery to be safer.

Still other suitable examples of the organic solvent include a mixed solvent containing an ether containing a fluorine substituent (such as pentafluoropropyl methylether or 2,2,3,3-tetrafluoropropyl difluoromethylether) and a dimethyl carbonate. The nonaqueous electrolyte that contains such a mixed solvent has a high capacity maintenance ratio even when discharged at a high voltage.

[13.4. Method for Producing Nonaqueous Electrolyte Secondary Battery Member and Method for Producing Nonaqueous Electrolyte Secondary Battery]

Examples of a method for producing the nonaqueous electrolyte secondary battery member include a method that involves disposing the positive electrode, the nonaqueous electrolyte secondary battery laminated separator, and the negative electrode in this order.

Examples of a method for producing the nonaqueous electrolyte secondary battery include a method including the following steps of:

1. placing the nonaqueous electrolyte secondary battery member in a container;
2. filling the container with the nonaqueous electrolyte; and
3. hermetically sealing the container while reducing pressure inside the container.

Figure 5:
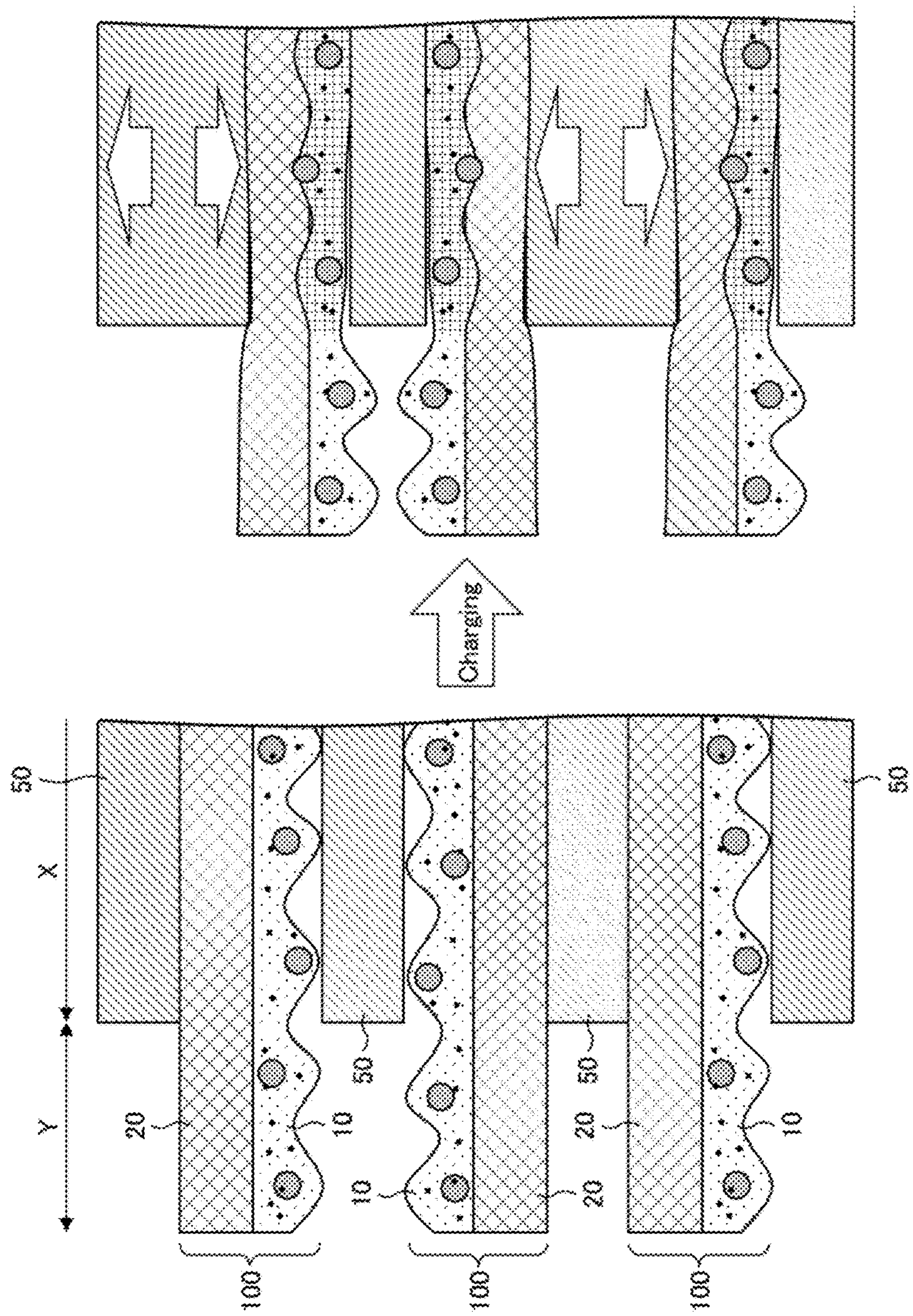
FIG. 5 is a schematic view for describing a difference in state between (a) a joint part of a laminated separator incorporated in a nonaqueous electrolyte secondary battery, the joint part being joined to an electrode, and (b) a non-joint part of the laminated separator, the non-joint not being joined to the electrode.

As indicated by X and Y in exemplary FIG. 5, when the laminated separator is incorporated in the nonaqueous electrolyte secondary battery, a joint part joined to the electrode and a non-joint part not being joined to the electrode are ordinarily formed. The electrode (in particular, the negative electrode) expands as the battery is charged. This causes the functional layer 10, which is joined to the electrode 50, to be compressed by expansion of the electrode 50. In contrast, the functional layer 10, which is not joined to the electrode 50, is not compressed. Thus, particularly when stored in the battery such that an internal pressure of the nonaqueous electrolyte secondary battery reaches not less than 20 MPa, the laminated separator can be defined as the following <A> to <E>.

<A>

A laminated separator including a polyolefin base material and a functional layer that are formed on top of each other, wherein when an internal pressure of a nonaqueous electrolyte secondary battery in which the laminated separator is stored reaches not less than 20 MPa, the functional layer has, in a part in contact with an electrode, a thickness that is preferably not more than 85%, more preferably not more than 83%, and still more preferably not more than 81% of the thickness of the functional layer in a part not joined to the electrode.

<B>

A laminated separator including a polyolefin base material and a functional layer that are formed on top of each other, wherein when an internal pressure of a nonaqueous electrolyte secondary battery in which the laminated separator is stored reaches not less than 20 MPa, the polyolefin base material has, in a part joined to an electrode, a thickness that is preferably not less than 95%, and more preferably not less than 96% of the thickness of the polyolefin base material in a part not joined to the electrode.

<C>

A laminated separator including a polyolefin base material and a functional layer that are formed on top of each other, wherein when an internal pressure of a nonaqueous electrolyte secondary battery in which the laminated separator is stored reaches not less than 20 MPa, an uneven space volume of a surface of the functional layer in a part not joined to an electrode is greater by, preferably not less than 0.15 $mL/m^2$, more preferably not less than 0.20 $mL/m^2$, and still more preferably not less than 0.25 $mL/m^2$, than the uneven space volume of the surface of the functional layer in a part joined to the electrode.

<D>

A laminated separator including a polyolefin base material and a functional layer that are formed on top of each other, wherein when an internal pressure of a nonaqueous electrolyte secondary battery in which the laminated separator is stored reaches not less than 20 MPa, a porosity of the functional layer in a part not joined to an electrode is preferably not less than 8%, more preferably not less than 9%, and still more preferably not less than 10% higher than the porosity of the functional layer in a part joined to the electrode.

<E>

A laminated separator including a polyolefin base material and a functional layer that are formed on top of each other, wherein when an internal pressure of a nonaqueous electrolyte secondary battery in which the laminated separator is stored reaches not less than 20 MPa, an interface distance between the functional layer and the polyolefin base material in a part not joined to an electrode is not less than 1.005 times longer than the interface distance between the functional layer and the polyolefin base material in a part joined to the electrode.

The present invention includes the following features.

<1>

A nonaqueous electrolyte secondary battery functional layer wherein in a cross section of the nonaqueous electrolyte secondary battery functional layer, an area ratio of pores each having a cross-sectional area of not less than 0.1 $\mu m^2$ is not less than 30% by area with respect to all pores present in the cross section.

<2>

A nonaqueous electrolyte secondary battery laminated separator including:

a nonaqueous electrolyte secondary battery functional layer recited in <1>; and a polyolefin base material, the nonaqueous electrolyte secondary battery functional layer and the polyolefin base material being formed on top of each other.

<3>

A nonaqueous electrolyte secondary battery member including:

a positive electrode;

a nonaqueous electrolyte secondary battery laminated separator recited in <2>; and a negative electrode, the positive electrode, the nonaqueous electrolyte secondary battery laminated separator, and the negative electrode being formed on top of each other in this order.

<4>

A nonaqueous electrolyte secondary battery including a nonaqueous electrolyte secondary battery functional layer recited in <1>, a nonaqueous electrolyte secondary battery laminated separator recited in <2>, or a nonaqueous electrolyte secondary battery member recited in <3>.

EXAMPLES

The following description will more specifically discuss the present invention with reference to Examples and Comparative Examples. Note, however, that the present invention is not limited to the following Examples and Comparative Examples.

Production Examples

Production Example 1

Preparation of polymerization solution 1

A polymerization solution 1 was prepared through the following procedure.

1-1. A 3-L separable flask having a stirring blade, a thermometer, a nitrogen incurrent canal, and a powder addition port was prepared. The flask was sufficiently dried.

1-2. As a solvent, 2,200 g of N-methyl-2-pyrrolidone was introduced into the flask. 1-3. As a solubilizing agent, 151 g of calcium chloride was added to the flask. The calcium chloride was vacuum-dried at 200° C. for 2 hours and then used.

1-4. The temperature in the flask was raised to 100° C. so that the calcium chloride was completely dissolved. The calcium chloride had a concentration of 6.4% by weight.

1-5. The temperature in the flask was returned to room temperature, and 68.23 g of paraphenylenediamine was added to the flask. The paraphenylenediamine was completely dissolved.

1-6. While the solution was being stirred with the temperature of the solution maintained at 20° C.±2° C., 124.97 g of terephthalic acid dichloride was added to the flask. The whole terephthalic acid dichloride was added, in 3 separate portions, to the flask at approximately 10-minute intervals.

1-7. The solution was matured for 1 hour while being stirred with the temperature of the solution maintained at 20° C.±2° C. The polymerization solution 1 containing 6% by weight of poly(paraphenylene terephthalamide) was thus obtained.

(Preparation of Coating Solution 1)

A coating solution 1 was prepared through the following procedure.

2-1. 12.0 g of aluminum oxide A (having an average particle diameter of 0.013 μm), 36.0 g of aluminum oxide B (having an average particle diameter of 3 μm), 4.5 g of calcium carbonate, and 748 g of N-methyl-2-pyrrolidone were measured and placed in a polyethylene cup.

2-2. A resulting mixed solution was dispersed with use of a homogenizer for 5 minutes (at 10,000 rpm). A dispersion liquid 1 was thus obtained.

2-3. 200 g of the polymerization solution 1 was added to the dispersion liquid 1.

2-4. A resulting mixed solution was dispersed with use of the homogenizer for 10 minutes (at 10,000 rpm).

2-5. A resulting mixed solution was dispersed with use of a Gaulin homogenizer, which is a high-pressure disperser (at 50 MPa). The mixed solution was passed through the homogenizer twice. The coating solution 1 was thus prepared. The coating solution 1 had a solid content concentration of 6.0% by weight.

(Production of Laminated Separator 1)

A laminated separator 1 was produced through the following procedure.

3-1. A porous polyethylene base material (having a thickness of 10 μm) was unwound from a roll.

3-2. An impregnation roll was used to impregnate one side of the porous polyethylene base material with N-methyl-2-pyrrolidone. It follows that in this step, the one side of the porous polyethylene base material was impregnated with a liquid identical to the solvent of the coating solution 1.

3-3. A bar coater was used to apply the coating solution 1 to the porous polyethylene base material. In so doing, the amount of the coating solution 1 applied was adjusted so that a functional layer had a weight per unit area of 2.6 $g/m^2$. A surface to which the coating solution 1 was applied is different from the surface which was impregnated with N-methyl-2-pyrrolidone in step 3-2.

3-4. The porous polyethylene base material to which the coating solution 1 was applied was introduced into a deposition tank. Water and air were sprayed into the deposition tank via a two-fluid nozzle so that a relative humidity of 100% was achieved. The temperature of the deposition tank was set to room temperature. The functional layer was thus deposited.

3-5. The porous polyethylene base material with the functional layer deposited was introduced into a water washing device. Washing with ion-exchange water removed N-methyl-2-pyrrolidone and calcium chloride from the porous polyethylene base material.

3-6. Hot air drying was carried out so that moisture was removed. The laminated separator 1 was thus obtained.

Production Example 2

The following points were changed in Production Example 1. Except for those points, a laminated separator 2 was obtained through a procedure similar to the procedure in Production Example 1.

In step 2-1, the amount of the aluminum oxide B mixed was changed to 24.0 g. Furthermore, the amount of N-methyl-2-pyrrolidone mixed was changed to 360 g. Thereafter, a coating solution 2 was prepared through steps 2-2 to 2-5. The coating solution 2 had a solid content concentration of 8.0% by weight.

In step 3-3, the amount of the coating solution 2 applied was adjusted so that the functional layer had a weight per unit area of 3.4 g/m$^2$.

Production Example 3

The following points were changed in Production Example 1. Except for those points, a laminated separator 3 was obtained through a procedure similar to the procedure in Production Example 1.

In step 2-1, the aluminum oxide B was changed to 27.5 g of boehmite A (having an average particle diameter of 2 μm). Furthermore, the amount of N-methyl-2-pyrrolidone mixed was changed to 614 g. Thereafter, a coating solution 3 was prepared through steps 2-2 to 2-5. The coating solution 3 had a solid content concentration of 6.0% by weight.

In step 3-3, the amount of the coating solution 3 applied was adjusted so that the functional layer had a weight per unit area of 3.0 g/m$^2$.

Production Example 4

The following points were changed in Production Example 3. Except for those points, a laminated separator 4 was obtained through a procedure similar to the procedure in Production Example 3.

In step 2-1, the boehmite A was changed to boehmite B (having an average particle diameter of 3 μm). Thereafter, a coating solution 4 was prepared through steps 2-2 to 2-5. The coating solution 4 had a solid content concentration of 6.0% by weight.

In step 3-3, the amount of the coating solution 4 applied was adjusted so that the functional layer had a weight per unit area of 2.2 g/m$^2$.

Production Example 5

The following points were changed in Production Example 1. Except for those points, a laminated separator 5 was obtained through a procedure similar to the procedure in Production Example 1.

In step 2-1, the aluminum oxide B was changed to polystyrene particles A (having an average particle diameter of 4 μm). Furthermore, the amount of N-methyl-2-pyrrolidone mixed was changed to 332 g. Thereafter, a coating solution 5 was prepared through steps 2-2 to 2-5. The coating solution 5 had a solid content concentration of 6.0% by weight.

In step 3-3, the amount of the coating solution 5 applied was adjusted so that the functional layer had a weight per unit area of 1.4 g/m$^2$.

Production Example 6

The following points were changed in Production Example 5. Except for those points, a laminated separator 6 was obtained through a procedure similar to the procedure in Production Example 5.

In step 2-1, the amount of the polystyrene particles A mixed was changed to 6.0 g. Furthermore, the amount of N-methyl-2-pyrrolidone mixed was changed to 378 g. Thereafter, a coating solution 6 was prepared through steps 2-2 to 2-5. The coating solution 6 had a solid content concentration of 5.0% by weight.

In step 3-3, the amount of the coating solution 6 applied was adjusted so that the functional layer had a weight per unit area of 1.3 g/m$^2$.

Production Example 7

The following points were changed in Production Example 6. Except for those points, a laminated separator 7 was obtained through a procedure similar to the procedure in Production Example 6.

In step 3-3, the amount of the coating solution 6 applied was adjusted so that the functional layer had a weight per unit area of 2.3 g/m$^2$.

Production Example 8

The following points were changed in Production Example 6. Except for those points, a laminated separator 8 was obtained through a procedure similar to the procedure in Production Example 6.

In step 3-3, the amount of the coating solution 6 applied was adjusted so that the functional layer had a weight per unit area of 2.6 g/m$^2$.

Production Example 9

The following points were changed in Production Example 5. Except for those points, a laminated separator 9 was obtained through a procedure similar to the procedure in Production Example 5.

In step 2-1, the amount of the polystyrene particles A mixed was changed to 2.7 g. Furthermore, the amount of N-methyl-2-pyrrolidone mixed was changed to 373 g. Thereafter, a coating solution 9 was prepared through steps 2-2 to 2-5. The coating solution 9 had a solid content concentration of 4.5% by weight.

In step 3-3, the amount of the coating solution 9 applied was adjusted so that the functional layer had a weight per unit area of 2.4 g/m$^2$.

Production Example 10

The following points were changed in Production Example 1. Except for those points, a laminated separator was obtained through a procedure similar to the procedure in Production Example 1

In step 2-1, the aluminum oxide B was changed to 10.8 g of polymethylmethacrylate particles A (having an average particle diameter of 5 μm). Furthermore, the amount of N-methyl-2-pyrrolidone mixed was changed to 546 g. Thereafter, a coating solution 10 was prepared through steps 2-2 to 2-5. The coating solution 10 had a solid content concentration of 4.5% by weight.

In step 3-3, the amount of the coating solution 10 applied was adjusted so that the functional layer had a weight per unit area of 1.2 g/m$^2$.

Production Example 11

The following points were changed in Production Example 1. Except for those points, a laminated separator 11 was obtained through a procedure similar to the procedure in Production Example 1.

In step 2-1, the aluminum oxide B was changed to 4.4 g of secondary particles of amorphous silica particles (having an average particle diameter of 5 μm). Primary particles constituting the secondary particles had an average particle diameter of 0.010 μm. Furthermore, the amount of N-methyl-2-pyrrolidone mixed was changed to 410 g. Thereafter, a coating solution 11 was prepared through steps 2-2 to 2-5. The coating solution 11 had a solid content concentration of 4.5% by weight.

In step 3-3, the amount of the coating solution 11 applied was adjusted so that the functional layer had a weight per unit area of 0.9 g/m$^2$.

Production Example 12

Preparation of Polymerization Solution 2

A polymerization solution 2 was prepared through the following procedure.

1. A 5-L separable flask having a stirring blade, a thermometer, a nitrogen incurrent canal, and a powder addition port was prepared. The flask was sufficiently dried.
2. As a solvent, 4,751 g of N-methyl-2-pyrrolidone was introduced into the flask.
3. As a solubilizing agent, 365 g of calcium chloride was added to the flask. The calcium chloride was vacuum-dried at 200° C. for 2 hours and then used. The calcium chloride had a concentration of 6.4% by weight.
4. The temperature in the flask was raised to 100° C. so that the calcium chloride was completely dissolved. The calcium chloride had a concentration of 7.1% by weight.
5. While the temperature of the solution was maintained at 100° C., 147.61 g of 4,4'-diaminodiphenylsulfone was added to the flask, and then a resulting mixture was completely dissolved.
6. The temperature of the solution was lowered to 25° C.
7. While the temperature of the solution was maintained at 25° C.±2° C., 118.82 g of terephthalic acid dichloride was added to the flask. The whole terephthalic acid dichloride was added, in 3 separate portions, to the flask.
8. A reaction solution A was obtained by causing a reaction inside the flask over 1 hour. In the reaction solution A, a block A was dissolved. The block A is a block constituted by poly(4,4'-diphenylsulfonyl terephthalamide).
9. 63.66 g of paraphenylenediamine was added to the flask, and a resulting solution was completely dissolved over 1 hour.
10. While the temperature of the solution was maintained at 25° C.±2° C., 117.41 g of terephthalic acid dichloride was added to the flask. The whole terephthalic acid dichloride was added, in 3 separate portions, to the flask.
11. A reaction solution B was obtained by causing a reaction inside the flask over 1.5 hour. In the reaction solution B, a block copolymer having a block B-block A-block B structure was dissolved. The block A is a block constituted by poly(4,4'-diphenylsulfonyl terephthalamide). Blocks B are each a block constituted by poly(paraphenylene terephthalamide).
12. The reaction solution B was matured for 1 hour while the temperature of the solution was maintained at 25° C.±2° C.
13. Air bubbles were removed by stirring for 1 hour under reduced pressure. The polymerization solution 2 was thus prepared. The polymerization solution 2 had a block copolymer concentration of 7% by weight. The block A and a total of the blocks B respectively account for 50 mol % of molecules of the block copolymer.

Preparation of Coating Solution 12

The following points were changed in preparation of the coating solution 1 in Production Example 1. Except for those points, a coating solution 12 was obtained through a procedure similar to the procedure in Production Example 1.

In step 2-1, the respective amounts of the components mixed were changed as below.
aluminum oxide A: 10.5 g
aluminum oxide B: 31.4 g
calcium carbonate: 748 g
N-methyl-2-pyrrolidone: 851 g In step 2-3, 150 g of the polymerization solution 2 was added instead of the polymerization solution 1.

In step 2-5, the solid content concentration of the coating solution 12 prepared was adjusted to 5% by weight.

(Production of Laminated Separator 12)

The following points were changed in production of the laminated separator 1 in Production Example 1. Except for those points, a laminated separator 12 was obtained through a procedure similar to the procedure in Production Example 1.

In step 3-3, the coating solution 1 was changed to the coating solution 12.

In step 3-3, the amount of the coating solution 12 applied was adjusted so that the functional layer had a weight per unit area of 2.8 g/m$^2$.

Production Example 13

The following points were changed in Production Example 12. Except for those points, a laminated separator 13 was obtained through a procedure similar to the procedure in Production Example 12.

In step 2-1, the aluminum oxide B was changed to 8.2 g of the polystyrene particles A. Furthermore, the amount of N-methyl-2-pyrrolidone mixed was changed to 412 g. Thereafter, a coating solution 13 was prepared through steps 2-2 to 2-5. The coating solution 13 had a solid content concentration of 5.0% by weight.

In step 3-3, the amount of the coating solution 13 applied was adjusted so that the functional layer had a weight per unit area of 1.7 g/m$^2$.

Comparative Production Example 1

The following points were changed in Production Example 1. Except for those points, a laminated separator C1 was obtained through a procedure similar to the procedure in Production Example 1.

In step 2-1, the aluminum oxide B was not mixed. Furthermore, the amount of N-methyl-2-pyrrolidone mixed was changed to 317 g. Thereafter, a coating solution C1 was prepared through steps 2-2 to 2-5. The coating solution C1 had a solid content concentration of 4.5% by weight.

In step 3-3, the amount of the coating solution C1 applied was adjusted so that the functional layer had a weight per unit area of 3.4 g/m$^2$.

Comparative Production Example 2

The following points were changed in Production Example 1. Except for those points, a laminated separator C2 was obtained through a procedure similar to the procedure in Production Example 1.

In step 2-1, the aluminum oxide B was changed to 12.0 g of aluminum oxide C (having an average particle diameter of 0.7 μm). Furthermore, the amount of N-methyl-2-pyrrolidone mixed was changed to 372 g. Thereafter, a coating solution C2 was prepared through steps 2-2 to 2-5. The coating solution C2 had a solid content concentration of 6.0% by weight.

In step 3-3, the amount of the coating solution C2 applied was adjusted so that the functional layer had a weight per unit area of 3.2 g/m$^2$.

Comparative Production Example 3

The following points were changed in Production Example 3. Except for those points, a laminated separator C3 was obtained through a procedure similar to the procedure in Production Example 1.

In step 2-1, the boehmite A was changed to boehmite C (having an average particle diameter of 0.6 μm). Thereafter, a coating solution C3 was prepared through steps 2-2 to 2-5. The coating solution C3 had a solid content concentration of 6.0% by weight.

In step 3-3, the amount of the coating solution C3 applied was adjusted so that the functional layer had a weight per unit area of 2.9 g/m$^2$.

Comparative Production Example 4

The following points were changed in Production Example 1. Except for those points, a laminated separator C4 was obtained through a procedure similar to the procedure in Production Example 1.

In step 2-1, the aluminum oxide B was changed to 9.0 g of polystyrene particles B (having an average particle diameter of 0.8 μm). Furthermore, the amount of N-methyl-2-pyrrolidone mixed was changed to 324 g. Thereafter, a coating solution C4 was prepared through steps 2-2 to 2-5. The coating solution C4 had a solid content concentration of 6.0% by weight.

In step 3-1, the thickness of the porous polyethylene base material prepared was changed to 9 μm.

In step 3-3, the amount of the coating solution C4 applied was adjusted so that the functional layer had a weight per unit area of 4.9 g/m$^2$.

Comparative Production Example 5

The following points were changed in Production Example 12. Except for those points, a laminated separator C5 was obtained through a procedure similar to the procedure in Production Example 12.

In step 2-1, the aluminum oxide B was not mixed. Furthermore, the amount of N-methyl-2-pyrrolidone mixed was changed to 255 g. Thereafter, a coating solution C5 was prepared through steps 2-2 to 2-5. The coating solution C5 had a solid content concentration of 5.0% by weight.

In step 3-3, the amount of the coating solution C5 applied was adjusted so that the functional layer had a weight per unit area of 3.3 g/m$^2$.

Table 1 below summarizes materials and makeups of the laminated separators produced in the above-described Production Examples and Comparative Production Examples.

In Table 1, "AVERAGE PARTICLE DIAMETER" is a particle diameter at which a cumulative frequency reaches 50% in a volume-based particle size distribution.

TABLE 1

| | Base material (thickness [μm]) | Polymer | Filler: Filler 1 (average particle diameter [μm]) | Filler: Filler 2 (average particle diameter [μm]) | Makeup [% by weight]: Polymer | Makeup [% by weight]: Filler 1 | Makeup [% by weight]: Filler 2 | Makeup [% by weight]: Total of fillers | Makeup [% by volume]: Polymer | Makeup [% by volume]: Filler 1 | Makeup [% by volume]: Filler 2 | Makeup [% by volume]: Total of fillers | Weight per unit area of functional layer [g/m$^2$] |
|---|---|---|---|---|---|---|---|---|---|---|---|---|---|
| Production Example 1 | Polyethylene (10) | PPTA | Aluminum oxide A (0.013) | Aluminum oxide B (3) | 20 | 20 | 60 | 80 | 40 | 18 | 42 | 60 | 2.6 |
| Production Example 2 | Polyethylene (10) | PPTA | Aluminum oxide A (0.013) | Aluminum oxide B (3) | 25 | 25 | 50 | 75 | 46 | 21 | 33 | 54 | 3.4 |
| Production Example 3 | Polyethylene (10) | PPTA | Aluminum oxide A (0.013) | Boehmite A (2) | 23 | 23 | 54 | 77 | 40 | 18 | 42 | 60 | 3.0 |
| Production Example 4 | Polyethylene (10) | PPTA | Aluminum oxide A (0.013) | Boehmite B (3) | 23 | 23 | 54 | 77 | 40 | 18 | 42 | 60 | 2.2 |
| Production Example 5 | Polyethylene (10) | PPTA | Aluminum oxide A (0.013) | Polystyrene A (4) | 36 | 36 | 28 | 64 | 40 | 18 | 42 | 60 | 1.4 |
| Production Example 6 | Polyethylene (10) | PPTA | Aluminum oxide A (0.013) | Polystyrene A (4) | 40 | 40 | 20 | 60 | 47 | 21 | 32 | 53 | 1.3 |
| Production Example 7 | Polyethylene (10) | PPTA | Aluminum oxide A (0.013) | Polystyrene A (4) | 40 | 40 | 20 | 60 | 47 | 21 | 32 | 53 | 2.3 |
| Production Example 8 | Polyethylene (10) | PPTA | Aluminum oxide A (0.013) | Polystyrene A (4) | 40 | 40 | 20 | 60 | 47 | 21 | 32 | 53 | 2.6 |
| Production Example 9 | Polyethylene (10) | PPTA | Aluminum oxide A (0.013) | Polystyrene A (4) | 45 | 45 | 10 | 55 | 57 | 26 | 17 | 43 | 2.4 |

TABLE 1-continued

| | Base material (thickness [μm]) | Polymer | Filler: Filler 1 (average particle diameter [μm]) | Filler: Filler 2 (average particle diameter [μm]) | Makeup [% by weight] | | | | Makeup [% by volume] | | | | Weight per unit area of functional layer [g/m²] |
|---|---|---|---|---|---|---|---|---|---|---|---|---|---|
| | | | | | Polymer | Filler 1 | Filler 2 | Total of fillers | Polymer | Filler 1 | Filler 2 | Total of fillers | |
| Production Example 10 | Polyethylene (10) | PPTA | Aluminum oxide A (0.013) | PMMA (5) | 34 | 34 | 31 | 65 | 40 | 18 | 42 | 60 | 1.2 |
| Production Example 11 | Polyethylene (10) | PPTA | Aluminum oxide A (0.013) | Porous silica (5) | 42 | 42 | 16 | 58 | 40 | 18 | 42 | 60 | 0.9 |
| Production Example 12 | Polyethylene (10) | Block | Aluminum oxide A (0.013) | Aluminum oxide B (3) | 20 | 20 | 60 | 80 | 40 | 18 | 42 | 60 | 2.8 |
| Production Example 13 | Polyethylene (10) | Block | Aluminum oxide A (0.013) | Polystyrene A (4) | 36 | 36 | 28 | 64 | 40 | 18 | 42 | 60 | 1.7 |
| Comparative Production Example 1 | Polyethylene (10) | PPTA | Aluminum oxide A (0.013) | — | 50 | 50 | 0 | 50 | 69 | 31 | 0 | 31 | 3.4 |
| Comparative Production Example 2 | Polyethylene (10) | PPTA | Aluminum oxide A (0.013) | Aluminum oxide C (0.7) | 33 | 33 | 34 | 67 | 55 | 25 | 20 | 45 | 3.2 |
| Comparative Production Example 3 | Polyethylene (10) | PPTA | Aluminum oxide A (0.013) | Boehmite C (0.6) | 23 | 23 | 54 | 77 | 40 | 18 | 42 | 60 | 2.9 |
| Comparative Production Example 4 | Polyethylene (9) | PPTA | Aluminum oxide A (0.013) | Polystyrene B (0.8) | 36 | 36 | 28 | 64 | 40 | 18 | 42 | 60 | 4.9 |
| Comparative Production Example 6 | Polyethylene (10) | Block | Aluminum oxide A (0.013) | — | 50 | 50 | 0 | 50 | 69 | 31 | 0 | 31 | 3.3 |

PPTA: poly(paraphenylene terephthalamide)
Block: copolymer of block B-block A-block B
PMMA: polymethylmethacrylate

Example 1

For example, a cycle test was carried out with respect to the laminated separators produced in Production Examples and Comparative Production Examples.

[Measurement Method]

(Thickness)

The thicknesses of the polyolefin base material and the laminated separator were measured with use of a high-accuracy digital measuring instrument (VL-50, Mitutoyo Corporation). The thickness of the functional layer was calculated by subtracting the thickness of the polyolefin base material from the thickness of the laminated separator.

(Weight Per Unit Area)

A square sample measuring 8 cm×8 cm was cut out from the laminated separator. The weight of the sample was measured and expressed as $W_1$(g). The weight per unit area of the laminated separator was calculated in accordance with the following Equation (1.1):

$$\text{Weight per unit area } (\text{g/m}^2) \text{ of laminated separator} = W_1(\text{g})/(0.08\times 0.08) \tag{1.1}$$

Next, a peeling tape was affixed to a surface of the laminated separator, the weight per unit area of which had been measured, on which surface the functional layer was formed, and then peeled off so that the functional layer was peeled off from the polyolefin base material. The weight of the polyolefin base material was measured and expressed as $W_2$ (g). The weight per unit area of the polyolefin base material was calculated in accordance with the following Equation (1.2):

$$\text{Weight per unit area } (\text{g/m}^2) \text{ of polyolefin base material} = W_2(\text{g})/(0.08\times 0.08) \tag{1.2}$$

The weight per unit area of the functional layer was calculated by subtracting the weight per unit area of the polyolefin base material from the weight per unit area of the laminated separator.

(Porosity of Functional Layer)

The porosity of the functional layer was calculated through the following procedure. The porosity of the functional layer calculated in this section corresponds to a total porosity of the functional layer, the total porosity including the internal void volume of the functional layer and the uneven space volume of the surface of the functional layer.

1. Parameters were Defined as Below.
   - Constituent materials of functional layer: a, b, c, . . . n
   - Respective weight ratios (% by weight) of constituting materials in functional layer: Wa, Wb, Wc, . . . , Wn
   - Respective real densities (g/cm³) of constituent materials: da, db, dc, . . . , do
   - Thickness (cm) of functional layer: t
2. From the parameters defined in step 1, the porosity ε (%) of the functional layer was calculated in accordance with the following Equation (1.3):

$$\varepsilon\ (\%) = \left(1-\left\{Wa/da+Wb/db+Wc/dc+\ldots+Wn/dn\right)/t\right\}\right]\times 100 \quad (1.3)$$

(SEM Observation of Cross Section)

A cross section of the laminated separator was subjected to SEM observation through the following procedure.

1. The laminated separator was cut by an ion milling method (IB-19520, JEOL Ltd.) so as to form a cut surface. The cut surface was obtained by cutting, in a direction perpendicular to a center of the laminated separator in a width direction, a line passing through a center of the laminated separator and parallel to a machine direction (MD).
2. The cut surface was subjected to osmium deposition.
3. A cross-sectional SEM image was obtained by observing a backscattered electron image with use of a scanning electron microscope (S-4800, Hitachi High-Technologies Corporation). Observation was carried out at an acceleration voltage of 2.0 kV and at a working distance of 5 mm.

(Area Ratio of Large-Diameter Pores)

An area ratio of large-diameter pores was calculated through the following procedure. ImageJ, which is image analysis software, was used.

1. An image of a functional layer part was binarized in a cross-sectional SEM image of the laminated separator.
2. Analyze Particles was executed. With this, an area of each of the pores was calculated.
3. A pore having an area of not less than 0.1 $\mu m^2$ was defined as a large-diameter pore.
4. The area ratio (% by area) of the large-diameter pores was calculated in accordance with the following Equation (1.4):

$$\text{Area ratio (\% by area) of large-diameter pores} = \text{total area of large-diameter pores/total area of all pores}\times 100 \quad (1.4)$$

(Cycle Test)

A cycle test was carried out through the following procedure.

1. A spring, a spacer (having a thickness of 0.5 mm), a lithium metal (having a diameter of 15 mm and a thickness of 0.5 mm, manufactured by Honjo Metal Co., Ltd.), two laminated separators (having a diameter of 19 mm and each disposed so that a functional layer and the lithium metal were in contact with each other), a lithium metal (having a diameter of 15 mm and a thickness of 0.5 mm, manufactured by Honjo Metal Co., Ltd.), and a spacer (having a thickness of 0.5 mm) were formed on top of each other in this order from above and stored in a coin battery container.
2. 180 μL of a nonaqueous electrolyte was injected, vacuum impregnation was carried out, and then 85 μL of the nonaqueous electrolyte was further injected, so that the container was caulked and sealed. The nonaqueous electrolyte was made up by dissolving 1 mol/L $LiPF_6$ in a mixed solvent obtained by mixing ethylene carbonate, ethyl methyl carbonate, and diethyl carbonate at a ratio (volume ratio) of 3:5:2.
3. A constant current was applied so that dissolution and deposition of the lithium metals were repeatedly carried out. The test was carried out under conditions in which a current density was 1.0 $mA/cm^2$, a period of time during which a single current application was carried out was 1 hour, a capacity was 1.0 $mA/cm^2$, and a temperature was 25° C.
4. The cycle test was ended when a voltage reached a cutoff value (±1.0 V) or when a short circuit occurred (the voltage reached 0 V). The number of cycles from the start to the end of the cycle test was measured.

In the cycle test, the lithium metals were used as electrodes, and the coin battery container was used. The lithium metals are subjected to a great change in volume caused by charge and discharge. A coin battery strongly confines a battery member and hardly allows expansion of an electrode. That is, a test cell in this cycle test is configured to increase an internal pressure. It can therefore be said that in the cycle test, a separator is tested while being substantially subjected to pressure application.

Result of Example 1

Table 2 shows results of Example 1. As can be seen from Table 2, the area ratio of the large-diameter pores was not less than 30% by area in each of the functional layers of the laminated separators 1 to 13. That is, the functional layers of the laminated separators 1 to 13 each contained the large-diameter pores at a ratio not less than a certain level. In contrast, the laminated separators C1 to C5 do not have such a property. It is found from comparison between the laminated separators 1 to 13 and the laminated separators C1 to C5 that the laminated separators 1 to 13 show more excellent results of the cycle test. Specifically, it is found that the laminated separators 1 to 13 have more excellent cycle characteristics.

TABLE 2

| | Thickness of laminated separator [μm] | Weight per unit area of functional layer [g/m$^2$] | Porosity of functional layer [%] | Air permeability during uncompression [s/100 mL] | Area ratio of large-diameter pores [% by area] | Cycle test [cycle] |
|---|---|---|---|---|---|---|
| Laminated separator 1 | 15.9 | 2.6 | 84 | 193 | 52.9 | 139 |
| Laminated separator 2 | 17.3 | 3.4 | 82 | 209 | 34.7 | 125 |
| Laminated separator 3 | 16.2 | 3.0 | 79 | 200 | 42.7 | 115 |
| Laminated separator 4 | 15.7 | 2.2 | 84 | 187 | 30.4 | 112 |
| Laminated separator 5 | 16.0 | 1.4 | 85 | 209 | 42.6 | 160 |
| Laminated separator 6 | 15.1 | 1.3 | 84 | 201 | 60.2 | 123 |

TABLE 2-continued

| | Thickness of laminated separator [μm] | Weight per unit area of functional layer [g/m²] | Porosity of functional layer [%] | Air permeability during uncompression [s/100 mL] | Area ratio of large-diameter pores [% by area] | Cycle test [cycle] |
|---|---|---|---|---|---|---|
| Laminated separator 7 | 17.4 | 2.3 | 81 | 211 | 44.1 | 175 |
| Laminated separator 8 | 18.2 | 2.6 | 81 | 224 | 43.4 | 137 |
| Laminated separator 8 | 16.2 | 2.4 | 77 | 232 | 43.4 | 100 |
| Laminated separator 10 | 16.3 | 1.2 | 88 | 186 | 48.8 | 101 |
| Laminated separator 11 | 16.2 | 0.9 | 89 | 197 | 49.5 | 149 |
| Laminated separator 12 | 16.1 | 2.8 | 83 | 188 | 52.6 | 116 |
| Laminated separator 13 | 16.4 | 1.7 | 83 | 192 | 49.5 | 158 |
| Laminated separator C1 | 16.1 | 3.4 | 70 | 295 | 0.0 | 77 |
| Laminated separator C2 | 16.1 | 3.2 | 77 | 227 | 12.4 | 99 |
| Laminated separator C3 | 15.8 | 2.9 | 79 | 195 | 25.6 | 89 |
| Laminated separator C4 | 19.4 | 4.9 | 70 | 160 | 24.5 | 76 |
| Laminated separator C5 | 15.7 | 3.3 | 69 | 257 | 0.0 | 84 |

Example 2

For example, an air permeability increase rate during 2 μm compression was measured for the laminated separators produced in Production Examples and Comparative Production Examples.

[Measurement Method]

(Thickness)

Calculation was carried out by a method identical to the method in Example 1.

(Weight Per Unit Area)

Calculation was carried out by a method identical to the method in Example 1.

(Porosity of Functional Layer)

Calculation was carried out by a method identical to the method in Example 1.

(Air Permeability During Uncompression)

The air permeability (Gurley value) during uncompression of the laminated separator was measured in conformity with JIS P8117.

(Air Permeability During 2 μm Compression)

The air permeability during 2 μm compression was measured through the following procedure.

1. A plurality of square samples each measuring 6 cm×6 cm were cut out from the laminated separator.
2. A sample cut out in step 1 was sandwiched between aluminum plates and pressed with use of a hydraulic compression molding machine. Pressing was carried out at MPa and at 35° C. for 5 minutes.
3. Another sample cut out in step 1 was sandwiched between the aluminum plates and pressed with use of the hydraulic compression molding machine. Pressing was carried out at MPa, at 35° C., and for 5 minutes.
4. A still another sample cut out in step 1 was sandwiched between the aluminum plates and pressed with use of the hydraulic compression molding machine. Pressing was carried out at 60 MPa, at 35° C., and for 5 minutes.
5. The thickness and the air permeability were measured for the pressed laminated separator obtained in each of steps 2 to 4. The method for measuring the thickness and the air permeability is as described earlier.
6. The thickness compression amount (μm) was calculated in accordance with the following Equation (2.1) on the basis of results of measurement in step 5.

$$\text{Thickness compression amount} = \text{thickness before pressing} - \text{thickness after pressing} \tag{2.1}$$

7. For the unpressed laminated separator and the pressed laminated separator obtained in each of steps 2 to 4, the thickness compression amount was plotted on the X-axis, and the air permeability was plotted on the Y-axis. From this plot, the air permeability (s/100 mL) during 2 μm compression was calculated in accordance with the following Equation (2.2):

$$\text{Air permeability } (s/100\text{ mL}) \text{ during } 2\ \mu\text{m compression} = \{(Y2-Y1)/(X2-X1)\times(2-X1)\}+Y1 \tag{2.2}$$

X1, X2, Y1, and Y2 in Equation (2.2) were determined as below. Specifically, among the four plotted points, coordinates of the point at which the thickness compression amount was less than 2 μm and was maximum were set as (X1,Y1), and coordinates of the point at which the thickness compression amount was more than 2 μm and was minimum were set as (X2,Y2). For example, when the thickness compression amount during 20 MPa compression is less than 2 μm and the thickness compression amount during 40 MPa compression is more than 2 μm, X1, X2, Y1, and Y2 have the respective following values.

X1: Thickness compression amount (μm) during 20 MPa compression

X2: Thickness compression amount (μm) during 40 MPa compression

Y1: Air permeability (s/100 mL) during 20 MPa compression

Y2: Air permeability (s/100 mL) during 40 MPa compression

When any of the thickness compression amount during 20 MPa compression, the thickness compression amount during 40 MPa compression, and the thickness compression amount during 60 MPa compression was exactly 2 μm, the air permeability during compression at that pressure was regarded as the air permeability during 2 μm compression. For example, when the thickness compression amount during MPa compression was exactly 2 μm, the air permeability during 20 MPa compression was regarded as the air permeability during 2 μm compression.

(Air Permeability Increase Rate During 2 μm Compression)

The air permeability increase rate (%) during 2 μm compression was calculated in accordance with the following Equation (2.3):

Air permeability increase rate (%) during 2 μm compression=air permeability (s/100 mL) during 2 μm compression/air permeability(s/100 mL) during uncompression×100 (2.3)

Result of Example 2

Table 3 shows results of Example 2. As described in Production Examples, the respective functional layers of the laminated separators 1 to 13 each contain both a filler having an average particle diameter of not more than 0.03 μm and a filler having an average particle diameter of not less than 1 μm. In contrast, the respective functional layers of the laminated separators C1 to C5 each contain only one of (i) the filler having an average particle diameter of not more than 0.03 μm and (ii) the filler having an average particle diameter of not less than 1 μm. As can be seen from Table 2, it is found from comparison between the laminated separators 1 to 13 and the laminated separators C1 to C5 that the laminated separators 1 to 13 have a lower air permeability increase rate during 2 μm compression. Specifically, it is found that even the laminated separators 1 to 13 which are compressed are less likely to increase in air permeability.

TABLE 3

| | Thickness of laminated separator [μm] | Weight per unit area of functional layer [g/m$^2$] | Porosity of functional layer [%] | Air permeability during uncompression [s/100 mL] | Air permeability during 2 μm compression [s/100 mL] | Air permeability increase rate during 2 μm compression [%] |
|---|---|---|---|---|---|---|
| Laminated separator 1 | 15.9 | 2.6 | 84 | 193 | 248 | 128 |
| Laminated separator 2 | 17.3 | 3.4 | 82 | 209 | 318 | 152 |
| Laminated separator 3 | 16.2 | 3.0 | 79 | 200 | 300 | 150 |
| Laminated separator 4 | 15.7 | 2.2 | 84 | 187 | 266 | 142 |
| Laminated separator 5 | 16.0 | 1.4 | 85 | 209 | 266 | 127 |
| Laminated separator 6 | 15.1 | 1.3 | 84 | 201 | 285 | 142 |
| Laminated separator 7 | 17.4 | 2.3 | 81 | 211 | 271 | 128 |
| Laminated separator 8 | 18.2 | 2.6 | 81 | 224 | 277 | 124 |
| Laminated separator 9 | 16.2 | 2.4 | 77 | 232 | 302 | 130 |
| Laminated separator 10 | 16.3 | 1.2 | 88 | 186 | 239 | 129 |
| Laminated separator 11 | 16.2 | 0.9 | 89 | 197 | 231 | 117 |
| Laminated separator 12 | 16.1 | 2.8 | 83 | 188 | 269 | 143 |
| Laminated separator 13 | 16.4 | 1.7 | 83 | 192 | 250 | 130 |
| Laminated separator C1 | 16.1 | 3.4 | 70 | 295 | 877 | 297 |
| Laminated separator C2 | 16.1 | 3.2 | 77 | 227 | 513 | 225 |
| Laminated separator C3 | 15.8 | 2.9 | 79 | 195 | 323 | 209 |
| Laminated separator C4 | 19.4 | 4.9 | 70 | 160 | 408 | 161 |
| Laminated separator C5 | 15.7 | 3.3 | 69 | 257 | 638 | 248 |

Example 3

For example, the 5C discharge capacity in the first cycle after 20 MPa pressure application was measured for the laminated separators produced in Production Examples and Comparative Production Examples

[Measurement Method]

(Thickness)

Calculation was carried out by a method identical to the method in Example 1.

(Weight Per Unit Area)

Calculation was carried out by a method identical to the method in Example 1.

(Air Permeability During Uncompression)

Calculation was carried out by a method identical to the method in Example 2.

(Porosity of Functional Layer)

Calculation was carried out by a method identical to the method in Example 1. The porosity corresponds to a total porosity of the functional layer, the total porosity including the internal void volume of the functional layer and the uneven space volume of the surface of the functional layer.

(Total Void Volume of Functional Layer)

The total void volume (%) of the functional layer was calculated in accordance with the following Equation (3.1):

$$\text{Total void volume (\%) of functional layer} = \text{porosity (\%) of functional layer}/100 \times \text{thickness } (\mu\text{m}) \text{ of functional layer} \quad (3.1)$$

(Uneven Space Volume and Unevenness Height of Surface of Functional Layer)

The uneven space volume and the unevenness height of the surface of the functional layer were measured through the following procedure.

1. The functional layer side of the laminated separator was observed while the polyolefin base material side of the laminated separator was brought into close contact with a stage. For observation, a laser microscope (VK-X3000, Keyence Corp.) and measurement software (VK-X3000 observation application, Keyence Corp.) were used. Measurement conditions were set as follows. Specifically, a mode of the measurement software was set to a simple measurement mode, a scanning mode was set to a laser confocal scanning mode, and an observation magnification was set to 150×.
2. A reference plane was set, and then a load curve of the surface of the functional layer was created on the basis of microscopic observation data. Analysis software (Multi-file Analysis Application, Keyence Corp.) was used to create the load curve. A range of analysis was provided in a central part of field of view with, for example, fewer lens aberrations.
3. A range of the load curve in which range the load area ratio was 10% to 80% was defined as a core region. A space volume ($mL/m^2$) in the core region was regarded as the uneven space volume of the surface of the functional layer. An average height of a projecting top part of the surface of the functional layer in which projecting top part the load area ratio is 0% to 10% was regarded as the unevenness height of the surface of the functional layer.

(Internal Void Volume of Functional Layer)

The internal void volume of the functional layer was calculated in accordance with the following Equation (3.2):

$$\text{Internal void volume } (mL/m^2) \text{ of functional layer} = \text{total void volume } (mL/m^2) \text{ of functional layer} - \text{uneven space volume } (mL/m^2) \text{ of surface functional layer} \quad (3.2)$$

(Average Pore Diameter of Functional Layer)

The average pore diameter of the functional layer was measured with use of Perm Porometer (model: CFP-1500A) manufactured by Porous Materials Inc. Note here that for measurement, GalWick (trade name) manufactured by Porous Materials Inc. was used as a test liquid to obtain the following curves (i) and (ii):

(i) a pressure-flow rate curve for the functional layer as immersed in the test liquid; and (ii) a pressure-flow rate curve for the functional layer as measured in a dried state and with the flow rate halved.

The average pore diameter (nm) of the functional layer was calculated with use of the following Equation (3.3) on the basis of the value of a pressure corresponding to a point of intersection of the curves (i) and (ii).

$$\text{Average pore diameter (nm)} = 4\cos\theta \times rP \times 1000 \quad (3.3)$$

where: r represents surface tension (mN/m) of the test liquid; P represents the above-mentioned pressure (Pa) corresponding to the point of intersection; and θ represents a contact angle)(° between a porous film and the test liquid.

(5C Discharge Capacity in First Cycle after 20 MPa Pressure Application)

First, a test nonaqueous electrolyte secondary battery in which a laminated separator subjected to 20 MPa pressure application was incorporated was produced through the following procedure.

1. The laminated separator was sandwiched between aluminum plates and pressed with use of a hydraulic compression molding machine. Pressing was carried out at MPa and at 35° C. for 5 minutes.
2. A positive electrode was prepared. The positive electrode had a thickness of 51 μm, a density of 2.95 $g/cm^3$, and a void volume of 25.2 μL. A positive electrode active material layer was made up of $LiNi_{0.78}Co_{0.19}Al_{0.03}O_2$, an electrically conductive material, and polyvinylidene fluoride at a weight ratio of 92:4:4.
3. A negative electrode was prepared. The negative electrode had a thickness of 59 μm, a density of 1.45 $g/cm^3$, and a void volume of 40.1 μL. A negative electrode active material layer was made up of artificial graphite, styrene butadiene rubber, and carboxymethyl cellulose at a weight ratio of 96.5:2.0:1.5.
4. The negative electrode, the laminated separator, and the positive electrode were formed on top of each other in this order so that a nonaqueous electrolyte secondary battery member was produced. In so doing, the negative electrode active material layer and the polyolefin base material side of the laminated separator were formed on top of each other so as to face each other. Furthermore, the positive electrode active material layer and the functional layer side of the laminated separator were formed on top of each other so as to face each other.

5. The nonaqueous electrolyte secondary battery member was stored in a bag including an aluminum layer and a heat-sealing layer that were formed on top of each other, and a nonaqueous electrolyte was injected into the bag. The amount of the nonaqueous electrolyte injected was set to 1.1 times relative to a total void volume of the electrode and the laminated separator. The nonaqueous electrolyte was made up by dissolving 1% by weight of vinylene carbonate and 1 mol/L $LiPF_6$ in a mixed solvent obtained by mixing ethylene carbonate, ethyl methyl carbonate, and diethyl carbonate at a ratio (volume ratio) of 3:5:2.
6. The bag was heat-sealed while pressure inside the bag was reduced. A test nonaqueous electrolyte secondary battery was thus produced.

Next, the discharge capacity was measured through the following procedure.

1. One cycle of initial charge and discharge was carried out at a temperature of 25° C., in a voltage range of 2.7 V to 4.2 V, at a current value of 0.1 C (charge), and at a current value of 0.2 C (discharge). Note here that 1 C is a current value at which a battery rated capacity derived from a one-hour rate discharge capacity is discharged in one hour.
2. A nonaqueous electrolyte secondary battery was aged by carrying out 10 cycles of charge and discharge at a temperature of 25° C., in a voltage range of 2.7 V to 4.2 V, at a current value of 1 C (charge), and at a current value of 5 C (discharge).
3. One cycle of charge and discharge was carried out at a temperature of 45° C., in a voltage range of 2.5 V to 4.2 V, at a current value of 1 C (charge), and at a current value of 5 C (discharge). The discharge capacity (mAh) in the first cycle was regarded as the 5C discharge capacity in the first cycle after 20 MPa pressure application.

Result of Example 3

Table 4 shows results of Example 3. As can be seen from Table 4, the functional layers of the laminated separators 1 to 13 each had an internal void volume of 2.5 mL/m$^2$, and the surfaces of the functional layers each had an uneven space volume of not less than 0.5 mL/m$^2$. That is, the functional layers of the laminated separators 1 to 13 each have a large void (internal void volume and uneven space volume). In contrast, the laminated separators C1 to C5 do not have such a property. It is found from comparison between the laminated separators 1 to 13 and the laminated separators C1 to C5 that the laminated separators 1 to 13 have a higher 5C discharge capacity after 20 MPa pressure application. Specifically, it is found that the laminated separators 1 to 13 have a higher high-rate discharge capacity during compression.

TABLE 4

| | Thickness of laminated separator [μm] | Weight per unit area of functional layer [g/m$^2$] | Porosity of functional layer [%] | Average pore diameter of functional layer [nm] | Air permeability during uncompression [s/100 mL] | Total void volume [mL/m$^2$] | Uneven space volume [mL/m$^2$] | Internal void volume [mL/m$^2$] | Internal porosity [%] | Uneveness height [μm] | 5 C discharge capacity after pressure application (first cycle) [mAh] |
|---|---|---|---|---|---|---|---|---|---|---|---|
| Laminated separator 1 | 15.9 | 2.6 | 84 | 32.9 | 193 | 4.7 | 0.9 | 3.8 | 81 | 1.1 | 14.94 |
| Laminated separator 2 | 17.3 | 3.4 | 82 | 31.6 | 209 | 5.7 | 0.9 | 4.8 | 79 | 0.9 | 18.89 |
| Laminated separator 3 | 18.2 | 3.0 | 79 | 34.3 | 200 | 4.7 | 0.6 | 4.1 | 77 | 0.7 | 16.39 |
| Laminated separator 4 | 15.7 | 2.2 | 84 | 33.4 | 187 | 4.5 | 0.8 | 3.7 | 81 | 0.8 | 20.76 |
| Laminated separator 5 | 16.0 | 1.4 | 85 | 30.5 | 209 | 4.9 | 1.3 | 3.6 | 80 | 1.6 | 17.06 |
| Laminated separator 6 | 15.1 | 1.3 | 84 | 32.3 | 201 | 4.0 | 1.2 | 2.8 | 79 | 1.3 | 18.31 |
| Laminated separator 7 | 17.4 | 2.3 | 81 | 31.1 | 211 | 5.8 | 1.2 | 4.6 | 77 | 1.3 | 16.84 |
| Laminated separator 8 | 18.2 | 2.6 | 81 | 30.1 | 224 | 6.4 | 1.1 | 5.3 | 78 | 1.0 | 17.13 |
| Laminated separator 9 | 16.2 | 2.4 | 77 | 29.1 | 232 | 4.6 | 0.8 | 3.8 | 74 | 1.1 | 12.65 |
| Laminated separator 10 | 16.3 | 1.2 | 88 | 32.3 | 186 | 5.3 | 1.5 | 3.8 | 84 | 2.1 | 14.51 |
| Laminated separator 11 | 16.2 | 0.9 | 89 | 31.7 | 197 | 5.3 | 0.8 | 4.5 | 87 | 1.9 | 13.51 |
| Laminated separator 12 | 16.1 | 2.8 | 83 | 33.5 | 188 | 4.8 | 1.1 | 3.7 | 79 | 1.1 | 14.16 |
| Laminated separator 13 | 16.4 | 1.7 | 83 | 32.4 | 192 | 5.0 | 1.4 | 3.6 | 77 | 1.5 | 14.10 |
| Laminated separator C1 | 16.1 | 3.4 | 70 | 24.2 | 295 | 4.0 | 0.2 | 3.8 | 69 | 0.2 | 11.07 |
| Laminated separator C2 | 16.1 | 3.2 | 77 | 31.3 | 227 | 4.5 | 0.4 | 4.1 | 75 | 0.3 | 7.24 |
| Laminated separator C3 | 15.8 | 2.9 | 79 | 33.9 | 195 | 4.3 | 0.4 | 3.9 | 77 | 0.4 | 8.07 |

TABLE 4-continued

| | Thickness of laminated separator [μm] | Weight per unit area of functional layer [g/m²] | Porosity of functional layer [%] | Average pore diameter of functional layer [nm] | Air permeability during uncompression [s/100 mL] | Total void volume [mL/m²] | Uneven space volume [mL/m²] | Internal void volume [mL/m²] | Internal porosity [%] | Uneveness height [μm] | 5 C discharge capacity after pressure application (first cycle) [mAh] |
|---|---|---|---|---|---|---|---|---|---|---|---|
| Laminated separator C4 | 19.4 | 4.9 | 70 | 40.6 | 160 | 7.3 | 0.3 | 7.0 | 69 | 0.3 | 7.34 |
| Laminated separator C5 | 15.7 | 3.3 | 69 | 28.3 | 257 | 3.7 | 0.3 | 3.4 | 67 | 0.2 | 7.48 |

Example 4

For example, a contact angle of an electrolyte and an electrode resistance after 20 MPa pressure application were measured for the laminated separators produced in Production Examples and Comparative Production Examples.

[Measurement Method]

(Thickness)

Calculation was carried out by a method identical to the method in Example 1.

(Weight Per Unit Area)

Calculation was carried out by a method identical to the method in Example 1.

(Porosity of Functional Layer)

Calculation was carried out by a method identical to the method in Example 1.

(SEM Observation of Cross Section)

Observation was carried out by a method identical to the method in Example 1.

(Area Ratio of Pores Subjected to Thickness Orientation)

The area ratio of the pores subjected to thickness orientation was calculated through the following procedure. ImageJ, which is image analysis software, was used to carry out image analysis.

1. An image of a functional layer part was binarized in a cross-sectional SEM image of the laminated separator.
2. Analyze Particles was executed. With this, an area, a maximum Feret diameter, a minimum Feret diameter, and an angle of the maximum Feret diameter with respect to an in-plane direction were calculated for each of the pores.
3. Pores which satisfied all conditions that the maximum Feret diameter was not less than 0.5 μm, the angle of the maximum Feret diameter with respect to the in-plane direction was not less than 60° to 120°, and the maximum Feret diameter/the minimum Feret diameter was not less than 1.2 were defined as the pores subjected to thickness orientation.
4. The area ratio (% by area) of the pores subjected to thickness orientation was calculated in accordance with the following Equation (4.1):

$$\text{Area ratio (\% by area) of pores subjected to thickness orientation} = \text{total area of pores subjected to thickness orientation/total area of all pores} \times 100 \tag{4.1}$$

(Contact Angle of Electrolyte)

The contact angle of the electrolyte was measured through the following procedure.

1. Onto a surface of a functional layer, 2 μL of a nonaqueous electrolyte was dropped. The nonaqueous electrolyte was made up by a mixed solvent obtained by mixing ethylene carbonate, ethyl methyl carbonate, and diethyl carbonate at a ratio (volume ratio) of 3:5:2.
2. The contact angle of the electrolyte was measured after five seconds from dropping. A contact angle meter (CA-X, Kyowa Interface Science Co., Ltd.) was used to measure the contact angle, and the contact angle was measured in accordance with a θ/2 method.

(Electrode Resistance after 20 MPa Pressure Application)

First, a test nonaqueous electrolyte secondary battery in which a laminated separator subjected to 20 MPa pressure application was incorporated was produced through a procedure similar to the procedure in Example 3.

Next, an electrode resistance after 20 MPa pressure application was measured through the following procedure.

1. One cycle of initial charge and discharge was carried out at a temperature of 25° C., in a voltage range of 2.7 V to 4.2 V, at a current value of 0.1 C (charge), and at a current value of 0.2 C (discharge). Note here that 1 C is a current value at which a battery rated capacity derived from a one-hour rate discharge capacity is discharged in one hour.
2. A nonaqueous electrolyte secondary battery was aged by carrying out 10 cycles of charge and discharge at a temperature of 25° C., in a voltage range of 2.7 V to 4.2 V, at a current value of 1 C (charge), and at a current value of 5 C (discharge).
3. An impedance analyzer (SI1260/SI1287, Solartron) was used to measure an alternating-current impedance at a temperature of 25°, an alternating-current voltage of 20 mV, and a measurement frequency of 0.1 Hz to 1 MHz. In a resulting Cole-Cole plot, assuming that a value of an equivalent series resistance (real axis) when reactance (imaginary axis) reaches 0 was a solution resistance (Ω), the electrode resistance (Ω) after 20 MPa pressure application was calculated by subtracting the value of the solution resistance from values (solution resistance+electrode resistance) of the equivalent series resistance when the reactance has a local minimum.

Result of Example 4

Table 5 shows results of Example 4. As can be seen from Table 5, the area ratio of the pores subjected to thickness orientation was not less than 3% by area in each of the functional layers of the laminated separators 1 to 13. That is, the functional layers of the laminated separators 1 to 13 each contained, at a ratio not less than a certain level, the pores subjected to thickness orientation. In contrast, the laminated separators C1 to C5 do not have such a property. It is found from comparison between the laminated separators 1 to 13 and the laminated separators C1 to C5 that the functional layers of the laminated separators 1 to 13 have a smaller contact angle of the electrolyte. Specifically, it is found that the functional layers of the laminated separators 1 to 13 have higher wettability to the electrolyte. This is considered to be because the functional layers of the laminated separators 1 to 13 have high liquid absorbency. It is also found from comparison between the laminated separators 1 to 13 and the laminated separators C1 to C5 that the laminated separators 1 to 13 have lower electrode resistance after 20 MPa pressure application. Specifically, it is found that the laminated separators 1 to 13 have lower electrode-separator resistance when subjected to pressure application.

(Weight Per Unit Area)

Calculation was carried out by a method identical to the method in Example 1.

(Porosity of Functional Layer)

Calculation was carried out by a method identical to the method in Example 1.

(Air Permeability During Uncompression)

Calculation was carried out by a method identical to the method in Example 2.

(Volume Fraction of Filler Having Particle Diameter of not Less than 0.1 μm)

A volume of a filler having a particle diameter of not less than 0.1 μm with respect to a total volume of a functional layer was regarded as a volume fraction of the filler having a particle diameter of not less than 0.1 μm. Specifically, in the functional layers of Production Examples and Comparative Production Examples, a volume fraction occupied by a filler that was not the aluminum oxide A was regarded as the volume fraction of the filler having a particle diameter of not less than 0.1 μm. Specifically, the volume fraction has a value identical to the value in the item "Filler 2" of Makeup [% by volume] in Table 1.

(SEM Observation of Cross Section)

Observation was carried out by a method identical to the method in Example 1.

TABLE 5

| | Thickness of laminated separator [μm] | Weight per unit area of functional layer [g/m$^2$] | Porosity of functional layer [%] | Air permeability during uncompression [s/100 mL] | Area ratio of pores subjected to thickness orientation [% by area] | Contact angle of electrolyte [°] | Electrode resistance after pressure application [Ω] |
|---|---|---|---|---|---|---|---|
| Laminated separator 1 | 15.9 | 2.6 | 84 | 193 | 6.3 | 0.0 | 2.68 |
| Laminated separator 2 | 17.3 | 3.4 | 82 | 209 | 20.8 | 7.4 | 2.11 |
| Laminated separator 3 | 16.2 | 3.0 | 79 | 200 | 3.8 | 8.0 | 2.63 |
| Laminated separator 4 | 15.7 | 2.2 | 84 | 187 | 4.4 | 0.0 | 2.43 |
| Laminated separator 5 | 16.0 | 1.4 | 85 | 209 | 15.0 | 0.0 | 2.69 |
| Laminated separator 6 | 15.1 | 1.3 | 84 | 201 | 32.9 | 7.8 | 2.51 |
| Laminated separator 7 | 17.4 | 2.3 | 81 | 211 | 30.2 | 8.6 | 2.31 |
| Laminated separator 8 | 18.2 | 2.6 | 81 | 224 | 19.1 | 7.1 | 2.07 |
| Laminated separator 9 | 16.2 | 2.4 | 77 | 232 | 13.0 | 8.9 | 2.49 |
| Laminated separator 10 | 16.3 | 1.2 | 88 | 186 | 21.0 | 0.0 | 2.38 |
| Laminated separator 13 | 16.2 | 0.9 | 89 | 197 | 28.0 | 0.0 | 2.15 |
| Laminated separator 12 | 16.1 | 2.8 | 83 | 188 | 11.9 | 0.0 | 2.53 |
| Laminated separator 13 | 16.4 | 1.7 | 83 | 192 | 4.6 | 0.0 | 2.18 |
| Laminated separator C1 | 16.1 | 3.4 | 70 | 295 | 0.0 | 14.8 | 2.77 |
| Laminated separator C2 | 16.1 | 3.2 | 77 | 227 | 0.0 | 10.4 | 3.14 |
| Laminated separator C3 | 15.8 | 2.9 | 79 | 195 | 0.2 | 9.7 | 3.26 |
| Laminated separator C4 | 19.4 | 4.9 | 70 | 160 | 2.8 | 10.4 | 4.25 |
| Laminated separator C5 | 15.7 | 3.3 | 69 | 257 | 0.0 | 12.7 | 4.65 |

Example 5

For example, a limit withstand voltage maintenance rate during 2 μm compression was measured for the laminated separators produced in Production Examples and Comparative Production Examples.

[Measurement Method]

(Thickness)

Calculation was carried out by a method identical to the method in Example 1.

(Ratio of Contact of Filler Having Particle Diameter of not Less than 0.1 μm with Polyolefin Base Material)

The ratio of contact of the filler having a particle diameter of not less than 0.1 μm with a polyolefin base material was calculated through the following procedure. A ratio of contact calculated through this procedure is the ratio of contact of the filler having a particle diameter of not less than 0.1 μm with the polyolefin base material.

1. The length of the interface between the functional layer and the polyolefin base material was measured in a cross-sectional SEM image of the laminated separator. ImageJ, which is image analysis software, was used to carry out image analysis.
2. In the same cross-sectional SEM image as that in step 1, the length of a part in which the polyolefin base material and the filler were in contact with each other was measured. ImageJ, which is image analysis software, was used to carry out image analysis.
3. The ratio of contact of the filler having a particle diameter of not less than 0.1 μm with the polyolefin base material was calculated in accordance with the following Equation (5.1):

$$\text{Ratio of contact of filler having particle diameter of not less than } 0.1\ \mu\text{m with polyolefin base material} = \text{total length of part in which polyolefin base material and filler are in contact with each other/length of interface between functional layer and polyolefin base material} \times 100 \quad (5.1)$$

(Limit Withstand Voltage During Uncompression)

A limit withstand voltage during uncompression was measured through the following procedure.

1. A piece having a size of 6 cm×6 cm was cut out from the laminated separator.
2. A positive electrode (NCA, JFE Techno-Research Corporation) was prepared. The positive electrode had a thickness of 70 μm and a density of 3.0 g/cm$^3$. The positive electrode was made up of $LiNi_{0.78}Co_{0.19}Al_{0.03}O_2$, an electrically conductive material, and polyvinylidene fluoride at a weight ratio of 92:4:4. 3. A negative electrode (graphite, JFE Techno-Research Corporation) was prepared. The negative electrode had a thickness of 78 μm and a density of 1.5 g/cm$^3$. The negative electrode was made up of graphite, styrene butadiene rubber, and carboxymethyl cellulose at a weight ratio of 96.5:2.0:1.5.
4. A piece having a size of 6 cm×5 cm was cut out from each of the positive electrode and the negative electrode. The pieces that had been cut out from the positive electrode and the negative electrode, respectively, each had an electrode coated part having a size of 5 cm×5 cm.
5. The negative electrode, the laminated separator, and the positive electrode were formed on top of each other in this order so that a test sample was obtained. In so doing, the electrode coated part of the negative electrode and the polyolefin base material side of the laminated separator were formed on top of each other so as to face each other. The electrode coated part of the positive electrode and the functional layer side of the laminated separator were formed on top of each other so as to face each other.
6. A withstanding voltage and insulation resistance tester (TOS9201, Kikusui Electronics Corp.) was connected to respective collector foil exposed parts (electrode uncoated parts) of the positive electrode and the negative electrode so that a breakdown voltage (kV) was measured. Measurement was carried out at an initial voltage of 0 V, a measurement frequency of 60 Hz, and a voltage increase rate of 25 V/s.

(Limit Withstand Voltage During 2 μm Compression)

A limit withstand voltage during 2 μm compression was measured through the following procedure.

1. First, pressure necessary for 2 μm compression of a laminated separator was calculated through the following procedure.

(1) A piece having a size of 1.5 cm×1.5 cm was cut out from the laminated separator and brought into close contact with a sample stage.

(2) A microcompression testing machine (MCT-510, SHIMADZU CORPORATION) was used to carry out a compression test. The compression test was carried out with use of a flat indenter (having a diameter of 50 μm) as an indenter, at a test force of 120 mN, and at an addition rate of 2.58 mN/s.

(3) On the basis of the test force when a displacement amount reached 2 μm, the pressure necessary for 2 μm compression of the laminated separator was calculated by the following Equation (5.2):

$$\text{Pressure (MPa) necessary for } 2\ \mu\text{m compression} = \text{test force (mN) at } 2\ \mu\text{m displacement/area of indenter } (1962.5\ \mu\text{m}^2) \times 1000 \quad (5.2)$$

2. In step 6 of a method for measuring the limit withstand voltage during uncompression, the breakdown voltage (kV) was measured while the pressure necessary for 2 μm compression of the laminated separator was applied to a central part of the test sample. A hand hydraulic press machine (manufactured by SHIMADZU CORPORATION, having a pressure application part diameter of 3.5 cm) was used to apply the pressure.

(Limit Withstand Voltage Maintenance Rate During 2 μm Compression)

The limit withstand voltage maintenance rate during 2 μm compression was calculated in accordance with the following Equation (5.3):

$$\text{Limit withstand voltage maintenance rate during } 2\ \mu\text{m compression} = \text{breakdown voltage during } 2\ \mu\text{m compression/breakdown voltage during uncompression} \times 100 \quad (5.3)$$

Result of Example 5

Table 6 shows results of Example 5. As can be seen from Table 6, in the laminated separators 1 to 13, the volume fraction of the filler having a particle diameter of not less than 0.1 μm is not less than 15% by volume, and the ratio of contact of the filler having a particle diameter of not less than 0.1 μm with the polyolefin base material was not more than 7%. That is, the laminated separators 1 to 13 contain submicron- to micron-sized fillers, and many of the fillers are distributed away from the polyolefin base material. In contrast, the laminated separators C2 to C6 do not have such a property. It is found from comparison between the laminated separators 1 to 13 and the laminated separators C2 to C6 that the laminated separators 1 to 13 have a higher limit withstand voltage maintenance rate during 2 μm compression. Specifically, it is found that the laminated separators 1 to 13 can maintain voltage resistance even during compression. This is considered to be because the submicron- to micron-sized fillers, which are located away from the polyolefin base material, cause less damage to the polyolefin base material even if the functional layer is compressed.

As can be seen from Table 6, the functional layer containing no submicron- to micron-sized filler tends to have higher air permeability (Gurley value) (see the laminated separators C1 and C5). It is found from this that in order to ensure air permeability at a certain level, it is necessary to cause the functional layer to contain a submicron- to micron-sized filler.

Calculation was carried out by a method identical to the method in Example 1.

(Porosity of Functional Layer)

Calculation was carried out by a method identical to the method in Example 1.

(Air Permeability During Uncompression)

Calculation was carried out by a method identical to the method in Example 2.

(SEM Observation of Cross Section)

Observation was carried out by a method identical to the method in Example 1.

(Ratio of Interface Distance/Direct Distance after 20 MPa Pressure Application)

The interface distance and the direct distance between the functional layer and the polyolefin base material after 20 MPa pressure application were measured through the following procedure.

TABLE 6

| | Thickness of laminated separator [μm] | Weight per unit area of functional layer [g/m²] | Porosity of functional layer [%] | Air permeability during uncompression [s/100 mL] | Filler of not less than 0.1 μm [% by volume] | Ratio of contact of filler [%] | Limit withstand voltage maintenance rate during 2 μm compression [%] |
|---|---|---|---|---|---|---|---|
| Laminated separator 1 | 15.9 | 2.6 | 84 | 193 | 42 | 3.9 | 89 |
| Laminated separator 2 | 17.3 | 3.4 | 82 | 209 | 33 | 3.4 | 94 |
| Laminated separator 3 | 16.2 | 3.0 | 79 | 200 | 42 | 4.6 | 82 |
| Laminated separator 4 | 15.7 | 2.2 | 84 | 187 | 42 | 6.8 | 80 |
| Laminated separator 5 | 16.0 | 1.4 | 85 | 209 | 42 | 5.9 | 86 |
| Laminated separator 6 | 15.1 | 1.3 | 84 | 201 | 32 | 6.5 | 96 |
| Laminated separator 7 | 17.4 | 2.3 | 81 | 211 | 32 | 4.5 | 73 |
| Laminated separator 8 | 18.2 | 2.6 | 81 | 224 | 32 | 1.6 | 95 |
| Laminated separator 9 | 16.2 | 2.4 | 77 | 232 | 17 | 1.8 | 92 |
| Laminated separator 10 | 16.3 | 1.2 | 88 | 186 | 42 | 2.9 | 70 |
| Laminated separator 11 | 16.2 | 0.9 | 89 | 197 | 42 | 4.9 | 85 |
| Laminated separator 12 | 16.1 | 2.8 | 83 | 188 | 42 | 3.6 | 90 |
| Laminated separator 13 | 16.4 | 1.7 | 83 | 192 | 42 | 0.7 | 95 |
| Laminated separator C1 | 16.1 | 3.4 | 70 | 295 | 0 | 0.0 | 91 |
| Laminated separator C2 | 16.1 | 3.2 | 77 | 227 | 20 | 10.4 | 55 |
| Laminated separator C3 | 15.8 | 2.9 | 79 | 195 | 42 | 8.6 | 60 |
| Laminated separator C4 | 19.4 | 4.9 | 70 | 160 | 42 | 11.3 | 55 |
| Laminated separator C5 | 15.7 | 3.3 | 69 | 257 | 0 | 0.0 | 77 |

Example 6

For example, the 5C discharge capacity in the 60th cycle after 20 MPa pressure application was measured for the laminated separators produced in Production Examples and Comparative Production Examples.

[Measurement Method]

(Thickness)

Calculation was carried out by a method identical to the method in Example 1.

1. A square sample measuring 6 cm×6 cm was cut out from the laminated separator.
2. A sample cut out in step 1 was sandwiched between aluminum plates and pressed with use of a hydraulic compression molding machine. Pressing was carried out at MPa and at 35° C. for 5 minutes.
3. In a cross-sectional SEM image of the pressed laminated separator, the length of the interface between the functional layer and the polyolefin base material was measured and regarded as the interface distance.

4. In the cross-sectional SEM image of the pressed laminated separator, the length of a line connecting ends of the interface between the functional layer and the polyolefin base material was measured and regarded as the direct distance. ImageJ, which is image analysis software, was used to carry out image analysis.
5. A ratio of interface distance/direct distance after 20 MPa pressure application was calculated in accordance with the following Equation (6.1):

$$\text{Ratio of interface distance/direct distance after 20 MPa pressure application} = \text{interface distance/direct distance} \quad (6.1)$$

(5C Discharge Capacity in 60th Cycle after 20 MPa Pressure Application)

First, a test nonaqueous electrolyte secondary battery in which a laminated separator subjected to 20 MPa pressure application was incorporated was produced through a procedure similar to the procedure in Example 1.

Next, a cycle test was carried out through the following procedure so as to measure the discharge capacity in the 60th cycle after 20 MPa pressure application.

1. One cycle of initial charge and discharge was carried out at a temperature of 25° C., in a voltage range of 2.7 V to 4.2 V, at a current value of 0.1 C (charge), and at a current value of 0.2 C (discharge). Note here that 1 C is a current value at which a battery rated capacity derived from a one-hour rate discharge capacity is discharged in one hour.
2. A nonaqueous electrolyte secondary battery was aged by carrying out 10 cycles of charge and discharge at a temperature of 25° C., in a voltage range of 2.7 V to 4.2 V, at a current value of 1 C (charge), and at a current value of 5 C (discharge).
3. 60 cycles of charge and discharge were carried out at a temperature of 45° C., in a voltage range of 2.5 V to 4.2 V, at a current value of 1 C (charge), and at a current value of 5 C (discharge). The discharge capacity (mAh) in the 60th cycle was regarded as the 5C discharge capacity in the 60th cycle after 20 MPa pressure application.

Result of Example 6

Table 7 shows results of Example 6. As can be seen from Table 7, the laminated separators 1 to 13 had a ratio of interface distance/direct distance after 20 MPa pressure application of not less than 1.005 times. That is, the functional layers of the laminated separators 1 to 13 are each embedded in the polyolefin base material after 20 MPa pressure application. In contrast, the laminated separators C1 to C5 do not have such a property. It is found from comparison between the laminated separators 1 to 13 and the laminated separators C1 to C5 that the laminated separators 1 to 13 have a higher discharge capacity in the 60th cycle after 20 MPa pressure application. Specifically, it is found that even the laminated separators 1 to 13 which are compressed can maintain a high-rate discharge capacity at a higher level after a charge and discharge cycle. This is considered to be because pressure is dispersed due to an increase in contact surface between the functional layer and the polyolefin base material during compression.

TABLE 7

| | Thickness of laminated separator [μm] | Weight per unit area of functional layer [g/m²] | Porosity of functional layer [%] | Air permeability during uncompression [s/100 mL] | Interface distance/direct distance | 5 C discharge capacity after pressure application (60th cycle) [mAh] |
|---|---|---|---|---|---|---|
| Laminated separator 1 | 15.9 | 2.6 | 84 | 193 | 1.028 | 11.4 |
| Laminated separator 2 | 17.3 | 3.4 | 82 | 209 | 1.005 | 13.6 |
| Laminated separator 3 | 16.2 | 3.0 | 79 | 200 | 1.017 | 12.4 |
| Laminated separator 4 | 15.7 | 2.2 | 84 | 187 | 1.024 | 14.7 |
| Laminated separator 5 | 16.0 | 1.4 | 85 | 209 | 1.017 | 12.3 |
| Laminated separator 6 | 15.1 | 1.3 | 84 | 201 | 1.019 | 15.3 |
| Laminated separator 7 | 17.4 | 2.3 | 81 | 211 | 1.008 | 13.7 |
| Laminated separator 8 | 18.2 | 2.6 | 81 | 224 | 1.007 | 13.1 |
| Laminated separator 9 | 16.2 | 2.4 | 77 | 232 | 1.007 | 8.4 |
| Laminated separator 10 | 16.3 | 1.2 | 88 | 186 | 1.021 | 9.5 |
| Laminated separator 11 | 16.2 | 0.9 | 89 | 197 | 1.010 | 9.6 |
| Laminated Separator 12 | 16.1 | 2.8 | 83 | 188 | 1.017 | 10.5 |
| Laminated separator 13 | 16.4 | 1.7 | 83 | 192 | 1.018 | 9.5 |
| Laminated separator C1 | 16.1 | 3.4 | 70 | 295 | 1.001 | 7.3 |

TABLE 7-continued

| | Thickness of laminated separator [μm] | Weight per unit area of functional layer [g/m²] | Porosity of functional layer [%] | Air permeability during uncompression [s/100 mL] | Interface distance/direct distance | 5 C discharge capacity after pressure application (60th cycle) [mAh] |
|---|---|---|---|---|---|---|
| Laminated separator C2 | 16.1 | 3.2 | 77 | 227 | 1.003 | 0.4 |
| Laminated separator C3 | 15.8 | 2.9 | 79 | 195 | 1.002 | 4.6 |
| Laminated separator C4 | 19.4 | 4.9 | 70 | 160 | 1.001 | 3.0 |
| Laminated separator C5 | 15.7 | 3.3 | 69 | 257 | 1.001 | 4.1 |

Example 7

For example, an alternating-current resistance increase rate during 2 μm compression was measured for the laminated separators produced in Production Examples and Comparative Production Examples.

[Measurement Method]

(Thickness)

Calculation was carried out by a method identical to the method in Example 1.

(Weight Per Unit Area)

Calculation was carried out by a method identical to the method in Example 1.

(Porosity of Functional Layer)

Calculation was carried out by a method identical to the method in Example 1.

(SEM Observation of Cross Section)

Observation was carried out by a method identical to the method in Example 1.

(Compressibility)

Compressibilities of a functional layer and a polyolefin base material was measured through the following procedure.

1. The thickness (μm) of the functional layer before pressure application and the thickness (μm) of the polyolefin base material before pressure application were measured from a cross-sectional SEM image of the laminated separator. ImageJ, which is image analysis software, was used to carry out image analysis.
2. A square sample measuring 6 cm×6 cm was cut out from the laminated separator.
3. The sample cut out in step 2 was sandwiched between aluminum plates and pressed with use of a hydraulic compression molding machine. Pressing was carried out at MPa and at 35° C. for 5 minutes. The sample was released from pressure after completion of pressing.
4. The thickness (μm) of the functional layer after pressure release and the thickness (μm) of the polyolefin base material after pressure release were measured from a cross-sectional SEM image of the laminated separator after pressure release. ImageJ, which is image analysis software, was used to carry out image analysis.
5. The compressibility (%) of the functional layer was measured in accordance with the following Equation (7.1). The compressibility (%) of the polyolefin base material was measured in accordance with the following Equation (7.2).

$$\text{Compressibility of the functional layer} = \left(1 - \text{thickness } (\mu\text{m}) \text{ of functional layer after pressure release/thickness } (\mu\text{m}) \text{ of functional layer before pressure application}\right) \times 100 \quad (7.1)$$

$$\text{Compressibility } (\%) \text{ of polyolefin base material} = \left(1 - \text{thickness of polyolefin base material after pressure release/thickness of polyolefin base material before pressure application}\right) \times 100 \quad (7.2)$$

(Compressibility Ratio)

A ratio of the compressibility of the functional layer to the compressibility of the polyolefin base material (the compressibility of the functional layer/the compressibility of the polyolefin base material) was calculated as a compressibility ratio. The compressibility ratio increases when the functional layer is more easily compressed than the polyolefin base material.

(Alternating-Current Resistance During Uncompression)

The alternating-current resistance of the laminated separator was measured through the following procedure.

1. Six laminated separators each measuring 6 cm×4.7 cm were cut out.
2. The six laminated separators were layered and sandwiched between two aluminum electrodes, so that a laminated body was produced. The aluminum electrode had a thickness of 25 μm and an electrode area of 4.5 cm×3.0 cm. To the aluminum electrode, a nickel tab coated with a sealant was ultrasonically welded. This step was carried out in a dry box (having a dew point of not higher than −50° C.).
3. To the laminated body, 250 μL of a nonaqueous electrolyte was poured, and an exterior aluminum laminate was vacuum-sealed. A test cell was thus produced. The nonaqueous electrolyte was made up by dissolving 1 mol/L $LiPF_6$ in a mixed solvent obtained by mixing ethylene carbonate, ethyl methyl carbonate, and diethyl carbonate at a ratio of 3:5:2 (volume ratio). This step was carried out in the dry box (having a dew point of not higher than −50° C.).
4. A fixing weight (measuring 5 cm×6 cm×8 cm and having a weight of approximately 2.2 kg) was placed on a laminated body part of the test cell.
5. An alternating-current impedance was measured with the weight placed on the laminated body part. The alternating-current resistance (Ω) of the laminated separator was thus measured. An LCR meter (IM3536, HIOKI E.E. CORPORATION) was used to measure the alternating-current impedance. Measurement was carried out at an alternating-current voltage of 10 mV and a measurement frequency of 20 kHz to 200 kHz. In a resulting Cole-Cole plot, a value of an equivalent series resistance (real axis) when reactance (imaginary axis) reaches 0 was regarded as the alternating-current resistance (Ω) during uncompression of the laminated separator.

(Alternating-Current Resistance During 2 μm Compression)

First, pressure necessary for 2 μm compression of the laminated separator was determined through a procedure similar to the method in Example 5 (for measuring the limit withstand voltage during 2 μm compression).

Next, the above-described method for measuring the alternating-current resistance was modified so as to measure the alternating-current resistance during 2 μm compression. Specifically, in step 5 of the method for measuring the alternating-current resistance, pressure was applied with use of a small pressing machine (H300-05, AS ONE Corporation.) so that pressure necessary for 2 μm compression would be applied to the test cell.

(Alternating-Current Resistance Increase Rate During 2 μm Compression)

The alternating-current resistance increase rate during 2 μm compression was calculated in accordance with the following Equation (7.3):

$$\text{Alternating-current resistance increase rate (\%) during 2 μm compression} = \text{alternating-current resistance (Ω) during 2 μm compression} / \text{alternating-current resistnace (Ω) during uncompression} \times 100 \quad (7.3)$$

Result of Example 7

Table 8 shows results of Example 7. As can be seen from Table 8, the laminated separators 1 to 13 each had a compressibility of the functional layer of not less than 15% and a compressibility of the polyolefin base material of not more than 5%. That is, when high pressure as high as approximately 20 MPa is applied to each of the laminated separators 1 to 13, the functional layer is compressed by a certain percentage or more, and the functional layer is compressed to a greater extent than the polyolefin base material. In contrast, the laminated separators C1 to C5 do not have such a property. It is found from comparison between the laminated separators 1 to 13 and the laminated separators C1 to C5 that the laminated separators 1 to 13 have a lower alternating-current resistance increase rate during 2 μm compression. Specifically, it is found that even the laminated separators 1 to 13 which are compressed are less likely to increase in alternating-current resistance.

TABLE 8

| | Thickness of laminated separator [μm] | Weight per unit area of functional layer [g/m$^2$] | Porosity of functional layer [%] | Air permeability during uncompression [s/100 mL] | Compressibility of functional layer [%] | Compressibility of base material [%] | Compressibility ratio | Alternating-current resistance increase rate during 2 μm compression [%] |
|---|---|---|---|---|---|---|---|---|
| Laminated separator 1 | 15.3 | 2.6 | 84 | 193 | 32 | 3 | 11 | 106 |
| Laminated separator 2 | 17.3 | 3.4 | 82 | 209 | 19 | 2 | 10 | 108 |
| Laminated separator 3 | 16.2 | 3.0 | 79 | 200 | 36 | 4 | 9 | 108 |
| Laminated separator 4 | 15.7 | 2.2 | 84 | 187 | 44 | 4 | 11 | 107 |
| Laminated separator 5 | 16.0 | 1.4 | 85 | 209 | 32 | 1 | 32 | 102 |
| Laminated separator 6 | 15.1 | 1.3 | 84 | 201 | 29 | 3 | 10 | 107 |
| Laminated separator 7 | 17.4 | 2.3 | 81 | 211 | 30 | 1 | 30 | 109 |
| Laminated separator 8 | 18.2 | 2.6 | 81 | 224 | 35 | 1 | 35 | 107 |
| Laminated separator 9 | 16.2 | 2.4 | 77 | 232 | 36 | 4 | 9 | 108 |
| Laminated separator 10 | 16.3 | 1.2 | 88 | 186 | 51 | 2 | 26 | 106 |
| Laminated separator 11 | 16.2 | 0.9 | 89 | 197 | 71 | 4 | 18 | 105 |
| Laminated separator 12 | 16.1 | 2.8 | 83 | 188 | 32 | 3 | 11 | 107 |
| Laminated separator 13 | 16.4 | 1.7 | 83 | 192 | 44 | 1 | 44 | 109 |
| Laminated separator C1 | 16.1 | 3.4 | 70 | 295 | 2 | 3 | 0.7 | 119 |
| Laminated separator C2 | 16.1 | 3.2 | 77 | 227 | 8 | 3 | 3 | 117 |

TABLE 8-continued

| | Thickness of laminated separator [μm] | Weight per unit area of functional layer [g/m²] | Porosity of functional layer [%] | Air permeability during uncompression [s/100 mL] | Compressibility of functional layer [%] | Compressibility of base material [%] | Compressibility ratio | Alternating-current resistance increase rate during 2 μm compression [%] |
|---|---|---|---|---|---|---|---|---|
| Laminated separator C3 | 15.8 | 2.9 | 79 | 195 | 2 | 3 | 0.7 | 122 |
| Laminated separator C4 | 19.4 | 4.9 | 70 | 160 | 11 | 2 | 6 | 112 |
| Laminated separator C5 | 15.7 | 3.3 | 69 | 257 | 2 | 8 | 0.3 | 116 |

Example 8

For example, a capacity recovery rate after cycles after MPa pressure application was measured for the laminated separators produced in Production Examples and Comparative Production Examples.

[Measurement Method]

(Thickness)

Calculation was carried out by a method identical to the method in Example 1.

(Compression Amount During Pressure Application, Compressibility During Pressure Application, Post-Release Recovery Amount, and Post-Release Recovery Rate of Laminated Separator)

A compression amount during pressure application, a compressibility during pressure application, a post-release recovery amount, and a post-release recovery rate of the laminated separator were calculated through the following procedure.

1. A 1.5 cm square laminated separator was cut out and brought into close contact with a sample stage as a sample.
2. A microcompression testing machine (MCT-510, SHIMADZU CORPORATION) was used to press, into a surface of the sample, a diamond flat indenter having a diameter of 50 μm. The flat indenter was pressed at a rate of 2.23 mN/s. The indenter was pressed into the surface until a time point when a load reached 40 mN (20 MPa), and the thickness of the laminated separator at that time point was regarded as the thickness of the laminated separator during pressure application.
3. Immediately after pressure reached 20 MPa, the flat indenter was lifted without setting a hold time. The indenter was lifted until a time point when the load reached 1 mN (0 MPa), and was held for 200 seconds. The thickness of the laminated separator at that time point was regarded as the thickness of the laminated separator after release.
4. The compression amount (μm) during pressure application, the compressibility (%) during pressure application, the post-release recovery amount (μm), and the post-release recovery rate (%) of the laminated separator were calculated in accordance with the following Equations (8.1) to (8.4):

$$\text{Compression amount } (\mu\text{m}) \text{ during pressure application of laminated separator} = \text{laminated separator thickness } (\mu\text{m}) - \text{laminated separator thickness during pressure application } (\mu\text{m}) \quad (8.1)$$

$$\text{Compressibility } (\%) \text{ during pressure application of laminated separator} = \text{thickness } (\mu\text{m}) \text{ of laminated separator during pressure application/thickness } (\mu\text{m}) \text{ of laminated separator} \times 100 \quad (8.2)$$

$$\text{Post-release recovery amount } (\mu\text{m}) \text{ of laminated separator} = \text{thickness } (\mu\text{m}) \text{ of laminated separator after release} - \text{thickness } (\mu\text{m}) \text{ of laminated separator during pressure application} \quad (8.3)$$

$$\text{Post-release recovery rate of laminated separator } (\%) = \text{thickness } (\mu\text{m}) \text{ of laminated separator after release/thickness } (\mu\text{m}) \text{ of laminated separator} \times 100 \quad (8.4)$$

(Compression Amount During Pressure Application, Compressibility During Pressure Application, Post-Release Recovery Amount, and Post-Release Recovery Rate of Polyolefin Base Material)

In accordance with the measurement method for the laminated separator, only the polyolefin base material was used as a sample to carry out measurement on the basis of steps 1 to 4 described above. The compression amount (μm) during pressure application, the compressibility (%) during pressure application, the post-release recovery amount (μm), and the post-release recovery rate (%) of the polyolefin base material were calculated in accordance with the following Equations (8.5) to (8.8):

$$\text{Compression amount } (\mu m) \text{ during pressure application of polyolefin base material} = \text{thickness } (\mu m) \text{ of polyolefin base material} - \text{thickness } (\mu m) \text{ of polyolefin base material during pressure application} \quad (8.5)$$

$$\text{Compressibility } (\%) \text{ during pressure application of polyolefin base material} = \text{thickness } (\mu m) \text{ of polyolefin base material during pressure application/thickness } (\mu m) \text{ of polyolefin base material} \times 100 \quad (8.6)$$

$$\text{Post-release recovery amount } (\mu m) \text{ of polyolefin base material} = \text{thickness } (\mu m) \text{ of polyolefin base material after release} - \text{thickness } (\mu m) \text{ of polyolefin base material during pressure application} \quad (8.7)$$

$$\text{Post-release recovery rate } (\%) \text{ of polyolefin base material} = \text{thickness } (\mu m) \text{ of polyolefin base material after release/thickness } (\mu m) \text{ of polyolefin base material} \times 100 \quad (8.8)$$

(Compression Amount During Pressure Application, Compressibility During Pressure Application, Post-Release Recovery Amount, and Post-Release Recovery Rate of Functional Layer)

The thickness (μm) during pressure application, the compression amount (μm) during pressure application, the compressibility (%) during pressure application, the post-release recovery amount (μm), and the post-release recovery rate (%) of the functional layer were calculated in accordance with the following Equations (8.9) to (8.14):

$$\text{Thickness } (\mu m) \text{ of functional layer during pressure application} = \text{thickness } (\mu m) \text{ of laminated separator during pressure application} - \text{thickness } (\mu m) \text{ of polyolefin base material during pressure application} \quad (8.9)$$

$$\text{Compression amount } (\mu m) \text{ during pressure application of functional layer} = \text{thickness } (\mu m) \text{ of functional layer} - \text{thickness } (\mu m) \text{ of functional layer during pressure application} \quad (8.10)$$

$$\text{Compressibility } (\%) \text{ during pressure application of functional layer} = \text{thickness } (\mu m) \text{ of functional layer during pressure application/thickness } (\mu m) \text{ of functional layer} \times 100 \quad (8.11)$$

$$\text{Thickness } (\mu m) \text{ of functional layer after release} = \text{thickness } (\mu m) \text{ of laminated separator after release} - \text{thickness } (\mu m) \text{ of polyolefin base material after release} \quad (8.12)$$

$$\text{Post-release recovery amount } (\mu m) \text{ of functional layer} = \text{thickness } (\mu m) \text{ of functional layer after release} - \text{thickness } (\mu m) \text{ of functional layer during pressure application} \quad (8.13)$$

$$\text{Post-release recovery rate } (\%) \text{ of functional layer} = \text{thickness } (\mu m) \text{ of functional layer after release/thickness } (\mu m) \text{ of functional layer} \times 100$$

(Elastic Recovery Rate of Functional Layer)

An elastic recovery rate (%) of the functional layer was calculated in accordance with the following Equation (8.15):

$$\text{Elastic recovery rate } (\%) \text{ of functional layer} = \text{post-release recovery amount } (\mu m) \text{ of functional layer/compression amount } (\mu m) \text{ during pressure application of functional layer} \times 100 \quad (8.15)$$

(Capacity Recovery Rate after Cycles after 20 MPa Pressure Application)

First, a test nonaqueous electrolyte secondary battery in which a laminated separator subjected to 20 MPa pressure application was incorporated was produced through a procedure similar to the procedure in Example 1.

Next, a cycle test was carried out through the following procedure so as to measure the capacity recovery rate after cycles after 20 MPa pressure application.

1. One cycle of initial charge and discharge was carried out at a temperature of 25° C., in a voltage range of 2.7 V to 4.2 V, at a current value of 0.1 C (charge), and at a current value of 0.2 C (discharge). Note here that 1 C is a current value at which a battery rated capacity derived from a one-hour rate discharge capacity is discharged in one hour.
2. A nonaqueous electrolyte secondary battery was aged by carrying out 10 cycles of charge and discharge at a temperature of 25° C., in a voltage range of 2.7 V to 4.2 V, at a current value of 1 C (charge), and at a current value of 5 C (discharge).
3. One cycle of charge and discharge was carried out at a temperature of 25° C., in a voltage range of 2.7 V to 4.2 V, at a current value of 1 C (charge), and at a current value of 0.2 C (discharge) so as to measure a 0.2 C discharge capacity (mAh) before cycles.

4. 60 cycles of charge and discharge were carried out at a temperature of 45° C., in a voltage range of 2.5 V to 4.2 V, at a current value of 1 C (charge), and at a current value of 5 C (discharge).
5. One cycle of charge and discharge was carried out at a temperature of 25° C., in a voltage range of 2.7 V to 4.2 V, at a current value of 1 C (charge), and at a current value of 0.2 C (discharge) so as to measure a 0.2 C discharge capacity (mAh) after cycles.
6. The capacity recovery rate (%) after cycles after 20 MPa pressure application was calculated in accordance with the following Equation (8.16):

$$\text{Capacity recovery rate (\%) after cycles after 20 MPa pressure application} = \text{0.2 C discharge capacity (mAh) after cycles} / \text{0.2 C discharge capacity (mAh) before cycles} \times 100 \quad (8.16)$$

Result of Example 8

Table 9 shows results of Example 8. As can be seen from Table 9, the laminated separators 1 to 13 each had an elastic recovery rate of the functional layer of not more than 20%. That is, the laminated separators 1 to 13 to which high pressure as high as approximately 20 MPa is applied are less prone to springback. In contrast, the laminated separators C1 to C5 do not have such a property. It is found from comparison between the laminated separators 1 to 13 and the laminated separators C1 to C5 that the laminated separators 1 to 13 have a higher capacity recovery rate after cycles after 20 MPa pressure application. Specifically, it is found that even the laminated separators 1 to 13 which have been compressed have a higher capacity recovery rate after a high-rate cycle. This is considered to be because, when the negative electrode expands, the functional layer reduces thickness so as to reduce pressure inside the battery, and damage to the negative electrode can be reduced because a force by which the negative electrode is pushed back is small.

Furthermore, the laminated separators 1 to 13 have a low elastic recovery rate. Thus, since the functional layer has already been compressed after pressing by a pressing machine, a force by which the electrode is pushed back is weak even when high pressure is applied inside the battery again. It is therefore considered that damage to the electrode is reduced. In contrast, the laminated separators C1 to C5 have a high elastic recovery rate. Thus, since the thickness of the functional layer has been recovered to a certain extent after pressing by a pressing machine, a force by which the electrode is pushed back is strong when high pressure is applied inside the battery again. It is therefore considered that the electrode is damaged.

TABLE 9

| | Thickness of laminated separator [μm] | Amount of compression during pressure application of laminated separator [μm] | Compressibility during pressure application of laminated separator [%] | Post-release recovery amount of laminated separator [%] | Post-release recovery rate of laminated separator [%] | Thickness of base material [μm] | Amount of compression during pressure application of base material [μm] | Compressibility during pressure application of base material [%] | Post-release recovery amount of base material [μm] | Post-release recovery rate of base material [%] |
|---|---|---|---|---|---|---|---|---|---|---|
| Laminated separator 1 | 15.9 | 4.0 | 25 | 1.0 | 6 | 10 | 2.2 | 22 | 0.9 | 9 |
| Laminated separator 2 | 17.3 | 4.2 | 24 | 1.2 | 7 | 10 | 2.2 | 22 | 0.9 | 9 |
| Laminated separator 3 | 16.2 | 3.8 | 23 | 1.2 | 7 | 10 | 2.2 | 22 | 0.9 | 9 |
| Laminated separator 4 | 15.7 | 4.2 | 27 | 1.1 | 7 | 10 | 2.2 | 22 | 0.9 | 9 |
| Laminated separator 5 | 16.0 | 3.9 | 24 | 1.0 | 6 | 10 | 2.2 | 22 | 0.9 | 9 |
| Laminated separator 6 | 15.1 | 4.2 | 28 | 1.1 | 7 | 10 | 2.2 | 22 | 0.9 | 9 |
| Laminated separator 7 | 17.4 | 5.0 | 29 | 1.3 | 8 | 10 | 2.2 | 22 | 0.9 | 9 |
| Laminated separator 8 | 18.2 | 5.2 | 28 | 1.2 | 7 | 10 | 2.2 | 22 | 0.9 | 9 |
| Laminated separator 9 | 16.2 | 4.0 | 25 | 1.2 | 7 | 10 | 2.2 | 22 | 0.9 | 9 |
| Laminated separator 10 | 16.3 | 4.5 | 28 | 1.2 | 7 | 10 | 2.2 | 22 | 0.9 | 9 |
| Laminated separator 11 | 16.2 | 4.0 | 25 | 1.0 | 6 | 10 | 2.2 | 22 | 0.9 | 9 |
| Laminated separator 12 | 16.1 | 4.3 | 27 | 1.0 | 6 | 10 | 2.2 | 22 | 0.9 | 9 |
| Laminated separator 13 | 16.4 | 4.4 | 27 | 1.1 | 7 | 10 | 2.2 | 22 | 0.9 | 9 |
| Laminated separator C1 | 16.1 | 2.7 | 17 | 1.1 | 7 | 10 | 2.2 | 22 | 0.9 | 9 |
| Laminated separator C2 | 16.1 | 2.9 | 18 | 1.1 | 7 | 10 | 2.2 | 22 | 0.9 | 9 |
| Laminated separator C3 | 15.8 | 3.0 | 18 | 1.1 | 7 | 10 | 2.2 | 22 | 0.9 | 9 |

TABLE 9-continued

| | Thickness of laminated separator [μm] | Amount of compression during pressure application of laminated separator [μm] | Compressibility during pressure application of laminated separator [%] | Post-release recovery amount of laminated separator [%] | Post-release recovery rate of laminated separator [%] | Thickness of base material [μm] | Amount of compression during pressure application of base material [μm] | Compressibility during pressure application of base material [%] | Post-release recovery amount of base material [μm] | Post-release recovery rate of base material [%] |
|---|---|---|---|---|---|---|---|---|---|---|
| Laminated separator C4 | 19.4 | 4.6 | 24 | 1.4 | 7 | 9 | 2.1 | 23 | 0.8 | 9 |
| Laminated separator C5 | 15.7 | 2.8 | 18 | 1.1 | 7 | 10 | 2.2 | 22 | 0.9 | 9 |

INDUSTRIAL APPLICABILITY

The present invention can be used in, for example, a nonaqueous electrolyte secondary battery.

REFERENCE SIGNS LIST

- 5: Filler
- 10: Nonaqueous electrolyte secondary battery functional layer
- 20: Polyolefin base material
- 50: Electrode
- 100: Nonaqueous electrolyte secondary battery laminated separator

The invention claimed is:

1. A nonaqueous electrolyte secondary battery functional layer wherein in a cross section of the nonaqueous electrolyte secondary battery functional layer, an area ratio of pores each having a cross-sectional area of not less than 0.1 $\mu m^2$ is not less than 30% by area with respect to all pores present in the cross section.

2. A nonaqueous electrolyte secondary battery laminated separator comprising:

the nonaqueous electrolyte secondary battery functional layer recited in claim 1; and a polyolefin base material, the nonaqueous electrolyte secondary battery functional layer and the polyolefin base material being formed on top of each other.

3. A nonaqueous electrolyte secondary battery member comprising:

a positive electrode;

the nonaqueous electrolyte secondary battery laminated separator recited in claim 2; and a negative electrode, the positive electrode, the nonaqueous electrolyte secondary battery laminated separator, and the negative electrode being formed on top of each other in this order.

4. A nonaqueous electrolyte secondary battery comprising the nonaqueous electrolyte secondary battery functional layer recited in claim 1.

5. A nonaqueous electrolyte secondary battery comprising the nonaqueous electrolyte secondary battery laminated separator recited in claim 2.

6. A nonaqueous electrolyte secondary battery comprising the nonaqueous electrolyte secondary battery member recited in claim 3.

* * * * *